(12) United States Patent
Lécuyer

(10) Patent No.: US 12,282,578 B2
(45) Date of Patent: *Apr. 22, 2025

(54) PRIVACY FILTERS AND ODOMETERS FOR DEEP LEARNING

(71) Applicant: Microsoft Technology Licensing, LLC, Redmond, WA (US)

(72) Inventor: Mathias François Roger Lécuyer, New York, NY (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/649,594

(22) Filed: Apr. 29, 2024

(65) Prior Publication Data
US 2024/0320360 A1   Sep. 26, 2024

Related U.S. Application Data

(63) Continuation of application No. 17/328,785, filed on May 24, 2021, now Pat. No. 12,008,125.

(60) Provisional application No. 63/170,975, filed on Apr. 5, 2021.

(51) Int. Cl.
*G06F 21/62*   (2013.01)
*G06N 3/04*    (2023.01)
*G06N 3/08*    (2023.01)

(52) U.S. Cl.
CPC .......... *G06F 21/6218* (2013.01); *G06N 3/04* (2013.01); *G06N 3/08* (2013.01)

(58) Field of Classification Search
CPC .............. G06F 21/6218; G06F 21/552; G06F 21/6245; G06F 2221/2119; G06N 3/04; G06N 3/08; G06N 3/045; G06N 3/084
See application file for complete search history.

(56) References Cited

U.S. PATENT DOCUMENTS

2021/0073677 A1* 3/2021 Peterson ................ G06N 20/00

OTHER PUBLICATIONS

Yu et al., Differentially Private Model Publishing for Deep Learning, 2019. (Year: 2019).*

(Continued)

*Primary Examiner* — Trong H Nguyen
(74) *Attorney, Agent, or Firm* — Schwegman Lundberg & Woessner, P.A.

(57) ABSTRACT

Generally discussed herein are devices, systems, and methods for improving phishing webpage content detection. A method can include instantiating an odometer with a nested privacy filter architecture, the nested privacy filter including privacy filters of different, increasing sizes, training a DL model, maintaining, during training and by a privacy odometer that operates using the nested privacy filter, a running total of privacy loss budget consumed by the training, and responsive to a query for the total privacy loss budget consumed, returning, by the odometer, a size of a smallest privacy filter of the nested privacy filters that is bigger than the running total of the privacy loss budget.

20 Claims, 10 Drawing Sheets

(56) References Cited

OTHER PUBLICATIONS

Rodriguez-Barroso et al., Federated Learning and Differential Privacy: Software tools analysis, the Sherpa.ai FL framework and methodological guidelines for preserving data privacy, 2020. (Year: 2020).*
Rogers et al., Privacy Odometers and Filters: Pay as you Go Composition, 2016. (Year: 2016).*
Abadi et al., Deep Learning with Differential Privacy, 2016. (Year: 2016).*

* cited by examiner

PRIVACY FILTERS AND ODOMETERS FOR DEEP LEARNING

RELATED APPLICATION

This application is a continuation of U.S. application Ser. No. 17/328,785, filed May 24, 2021, and claims the benefit of priority to U.S. Provisional Patent Application No. 63/170,975 titled "Practical Privacy Filters and Odometers with R'enyi Differential Privacy and Applications to Differentially Private Deep Learning" and filed on Apr. 5, 2021, which applications are incorporated herein by reference in their entirety.

BACKGROUND

Differential privacy (DP) is a system for sharing information about a dataset while withholding information about individuals in the dataset. A technique that was designed based on data can, roughly, be determined to be differentially private if an observer of output of the technique cannot tell whether information of an individual was used in the technique. DP includes adding noise to a computation performed on data (or the data that is provided to the computation) such that the privacy loss is provably bounded.

A language model, for example, can provide a language prediction given an input. For some language models, for example, some of the training data has been reverse engineered based on model operation. This means that the training data did not remain private.

SUMMARY

A privacy odometer allows an entity to track realized privacy loss as it is consumed. A method, device, or machine-readable medium for DP DL can include use of an odometer that uses a nested filter architecture that improves upon a prior stacked filter architecture. The method, device, or machine-readable medium can perform operations including instantiating an odometer with a nested privacy filter architecture, the nested privacy filter including privacy filters of different, increasing sizes and maintaining, during training and by a privacy odometer that operates using the nested privacy filter, a running total of privacy loss budget consumed by the training. The method, device, or machine-readable medium can further include responsive to a query for the total privacy loss budget consumed, returning, by the odometer, a size of a smallest privacy filter of the nested privacy filters that is bigger than the running total of the privacy loss budget, at operation.

The method, device, or machine-readable medium can further include, wherein the operations further comprise, after a specified number of iterations of training the DL model, determining a DL model characteristic of the DL model and accounting for a privacy loss budget consumed in determining the DL model characteristic. The method, device, or machine-readable medium can further include, wherein the DL model characteristic includes an overall training set or testing set accuracy of the DL model or a difference in training set or testing set accuracy between a current epoch and an immediately prior epoch. The method, device, or machine-readable medium can further include, wherein the DL model characteristic is the difference in training set accuracy. The method, device, or machine-readable medium can further include wherein the operations further comprise, responsive to determining the difference in training set accuracy satisfies a first criterion, decreasing an amount of privacy budget consumed in an immediately subsequent epoch. The method, device, or machine-readable medium can further include, wherein decreasing the amount of privacy budget consumed includes increasing an amount of noise applied to a gradient computation for updating the DL model. The method, device, or machine-readable medium can further include, wherein decreasing the amount of privacy budget consumed includes decreasing a batch size of training data for the next epoch. The method, device, or machine-readable medium can further include, wherein the operations further comprise, responsive to determining the difference in training set accuracy satisfies a different, second criterion, increasing an amount of privacy budget consumed in an immediately subsequent epoch. The method, device, or machine-readable medium can further include, wherein the DL model characteristic includes the overall training set accuracy of the DL model (an accuracy of the DL model across the training set). One could alternatively use the test set accuracy, but the training set is typically much larger than the testing set, so computing the accuracy on the training set typically has a lower privacy cost. The method, device, or machine-readable medium can further include wherein the operations further comprise, responsive to determining the overall training set accuracy satisfies a second criterion, terminating the training.

The method, device, or machine-readable medium can further include, wherein the operations further comprise, responsive to determining the running total of privacy loss budget consumed is such that a next iteration of training will make the running total of privacy loss budget consumed exceed a total allowable privacy loss, terminating the training. The method, device, or machine-readable medium can further include, wherein the operations further comprise receiving, from a user and by a user interface, the total allowable privacy loss.

DETAILED DESCRIPTION

Figure 1:
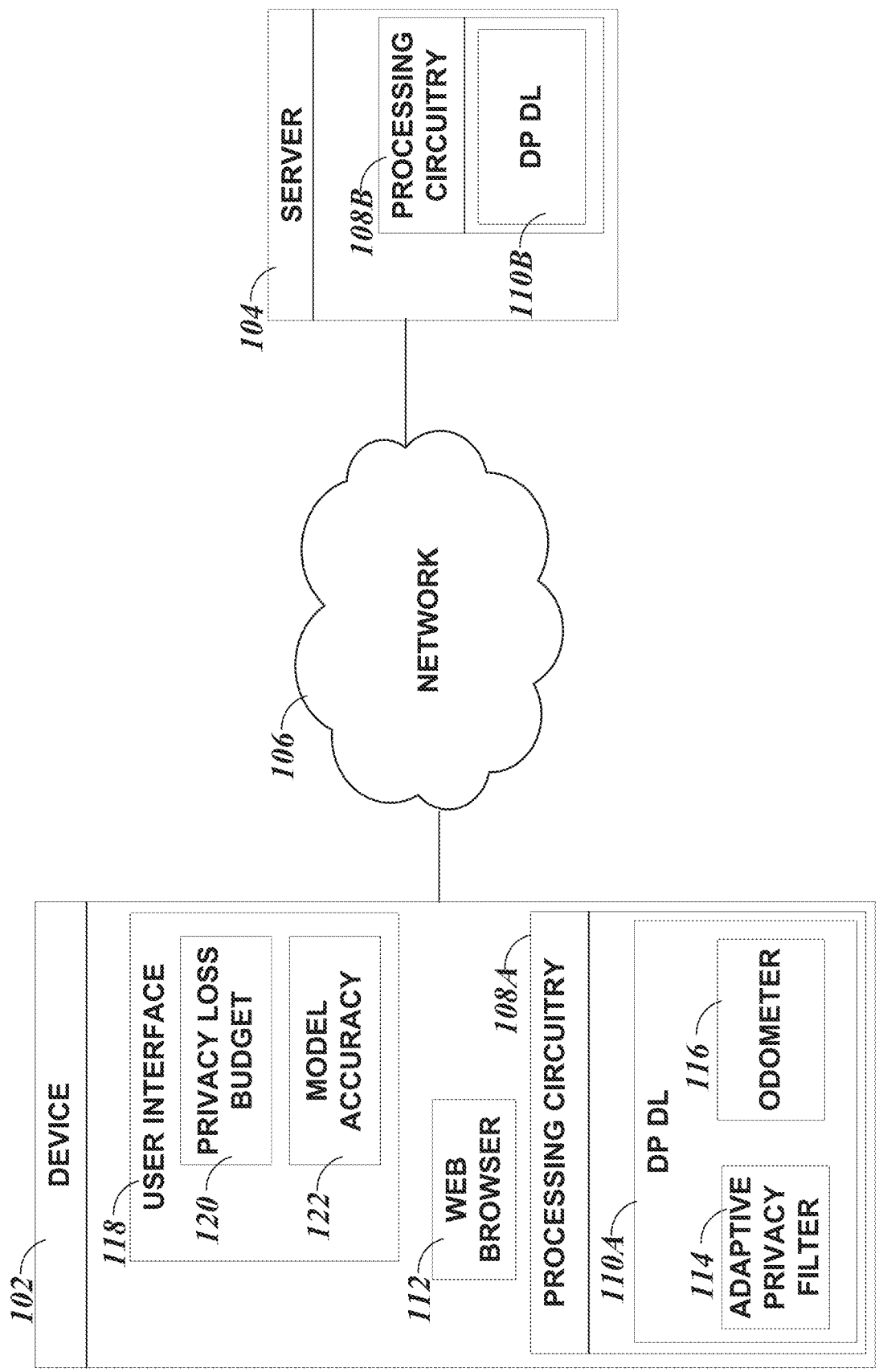
FIG. 1 illustrates, by way of example, a block diagram of a device and a server configured to implement DP DL either alone or in combination.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

When an entity releases a model to the public, it is generally unknown whether private information that was used to generate the model can be determined based on the model operations. A user, by adjusting inputs to the model, might be able to determine data that was input into the model during training. Aspects of embodiments can help provide privacy guarantees for data privacy in such model releases. Aspects of the disclosure improve upon prior privacy filters and privacy odometers. A prior filter system provided an odometer that stacked filters of a set size to monitor privacy budget consumed. A prior odometer and the prior filter are not practical for DP deep learning (DL) in many circumstances. Privacy filters and privacy odometers herein provide improvements over the prior privacy filters and odometers that make them practical for DP DL. The odometer improves upon the prior stacked structure by using a privacy filter with a nested architecture instead of a stacked architecture. The nested filters are of increasing sizes. An odometer leverages the nested privacy filter to provide an ability to stop DL model training (fine-tuning) when either the model is sufficiently accurate or the privacy loss budget is consumed.

A privacy filter controls an amount of privacy loss at a series of queries (a query is a gradient training step in the context of DL). The privacy filter ensures that the set of queries it is monitoring is below a privacy loss set in advance. When the set of queries (gradient steps) made since the beginning of training outgrows the filter, a new larger filter is instantiated which holds all those queries but also has room for additional queries.

An odometer leverages a series of privacy filters and a composition theorem to monitor a total privacy loss budget consumed by the queries.

DP is a promising approach to privacy preservation in deep learning (DL) model training. Noise can be added to the gradient update to make the data more private. An amount of privacy loss at each gradient training step can be quantified and count towards a total privacy loss budget. As such, there are multiple efforts to provide drop-in integration of DP into popular DL frameworks. These efforts, which add noise to each gradient computation to make it differentially private, rely on composition theorems to bound the total privacy loss incurred over the sequence of DP computations. A composition theorem defines how to quantify the amount of privacy loss over multiple training steps.

However, existing composition theorems present a tension between efficiency and flexibility. Most composition theorems require all computations in the sequence to have a predefined DP parameter, called the privacy budget, which defines an upper bound to an amount of privacy loss that is acceptable to a user training the model. This prevents the design of training techniques that adapt the privacy budget on the fly and prevents early termination to reduce the total privacy loss. Alternatively, a few existing composition results for adaptive privacy budgets provide complex bounds on the privacy loss, with constants too large to be practical. Providing flexibility in an amount of privacy loss allows a user to create a model that is accurate to a specified criterion while reducing the privacy loss. More details regarding the adaptability of embodiments are provided below.

The study of DP composition under adaptively chosen privacy parameters was initiated by others that formalized privacy odometers and filters for $(\epsilon, \delta)$-DP and showed constructions with optimal rate. Both $\epsilon$ and $\delta$ are parameters of the DP guarantee. $\epsilon$ measures the privacy loss, and $\delta$ a probability of failure (that the privacy loss is higher than thought). $\epsilon$ is typically called the budget, because $\delta$ is fixed, which gives a total $\epsilon$ to "spend" over multiple queries. This is for all DP composition. A privacy filter can be initialized with an $\epsilon$ and $\delta$ that represent the worst privacy loss/failure probability that one is willing to tolerate. Then queries can be issued, each with their own, smaller $\epsilon$ and $\delta$. The privacy filter will indicate to stop when a next query to be executed would make the guarantee be worse than the total defined $\epsilon$ and $\delta$ (that is the composition of all queries so far is below the total $\epsilon$ and $\delta$ configured, but issuing this one extra query would go over budget, so the query is prevented from executing).

It is called a budget because the desired final guarantee is "split" between the queries to be run (using a composition theorem). So, each query gets its own $\epsilon$ and $\delta$ to use, such that the composition of all queries remains within the final budget. In the context of a filter, the filter is initiated with an $\epsilon$ and $\delta$ (the final/total budget), and queries are run with adaptive budgets (that is, one can decide what $\epsilon$ and $\delta$ budget to give to each query based on previous results) until the filter indicates to stop. The filter ensures that the final/global parameters are never crossed. For an odometer, one can keep composing adaptively, and can ask "how much has been spent so far?". That is, if queries were to stop now, what is the total budget spent (instead of having to fix it in advance).

The overhead of the privacy filter, as well as the limitations when dealing with larger DP budgets and the Gaussian mechanism have limited the practical impact of these results. Some applications exist but are further tailored to restricted settings or using basic composition. A filter and odometer herein alleviate these limitations.

A filter and odometer herein are built on Rényi DP (RDP), a relaxation of pure $\epsilon$-DP which offers strong semantics and enables tighter accounting of privacy composition under non adaptive privacy parameters. Due to its more intuitive and tighter accounting, RDP has become a major building block in DP libraries for deep learning, such as Opacus and TensorFlow Privacy.

Aspects herein further regard DP composition under adaptive privacy budgets through a lens of Rényi Differential Privacy, proving a simpler composition theorem with smaller constants. Aspects provides constraints that are sufficiently practical to use in DL technique design. Two applications of these aspects for DP DL include: (1) adapting the noise or batch size online to improve accuracy of a model accuracy within a fixed total privacy loss, and (2) stopping early when fine-tuning a model to reduce total privacy loss, among others.

Performing statistical analyses and training machine learning (ML) models have both been shown to leak information about individual data points used in the process. DP is a promising approach to prevent such privacy leakage, such as by adding noise to any computation performed on the data. The noise can be added such that the privacy loss is provably bounded. Due to strong privacy guarantees of DP, multiple efforts exist to integrate it into libraries, including for statistical queries (e.g., OpenDP from Google LLC of Menlo Park, California), ML (e.g., differential privacy library from International Business Machines (IBM) Corporation of Armonk, New York), and DL (e.g., Opacus from Facebook, Inc. of Menlo Park, California or the open source Privacy from TensorFlow). The DP analysis in these libraries rely on composing results of a sequence of DP computations, consisting for instance in a sequences of statistical queries, or a sequence of mini-batches of gradients in DL. Each computation in the sequence can be seen as consuming some privacy budget, that depends on the size of the noise added to the result of the computation.

Composition theorems can then be applied to bound to the total privacy budget, or privacy loss, used over the sequence. However efficient DP composition theorems require that all computations in the entire sequence have a privacy budget fixed a priori. This creates a mismatch between the theory and practical requirements. A user that interacts with a dataset through statistical queries or develop an ML model will typically want to adapt a next query or DP budget allocation of a model based on previous results. This provides an adaptive behavior. At the technique level, this mismatch is visible in the application programming interfaces (APIs) developed for DP DL that track DP computations as they happen during training. Users are responsible for avoiding early stopping or other types of parameter adaptation. This restriction reduces the design space for DP DL techniques, ruling out early stopping to reduce overall privacy loss, DP budgets that adapt during training to improve the final performance, and online architecture search to adapt the complexity of the model to the data within DP constraints.

A study of adaptive composition defines two relevant interaction models that yield different asymptotic rates for composition theorems: (i) a privacy filter model that enforces an a priori bound on the total privacy loss that can reach the same rate as non-adaptive composition, and (ii) a privacy odometer model that is more costly, but more flexible since it provides a running upper-bound on the sequence of DP computations performed so far, which can stop at any time. However, there is a penalty to pay in asymptotic rate. The study provides composition theorems with optimal rate for both models, but the bounds are complex and with large constants, making them impractical.

A different study shows improved filters but unsatisfactory odometers. Aspects provide both privacy filters and odometers through the lens of Rényi Differential Privacy (RDP). RDP is an analysis tool for DP composition that enables intuitive privacy loss tracking and provides efficient composition results under a non-adaptive privacy budget. RDP has become a key building block in some DP DL libraries.

RDP can be used to provide privacy filters without incurring any cost for adaptivity. Aspects build on this result to construct privacy odometers that remove limitations of previously known results, in particular in regimes relevant for DP DL. Two applications of these theoretical results when training DP DL models includes (i) leveraging a privacy filter to show that even basic policies to adapt on the fly the noise added to gradient computations, as well as the batch size, yield improved accuracy of more than 2.5% within a fixed privacy loss bound on specified dataset and (ii) in a fine-tuning scenario, a privacy odometer of aspects enable a large reduction in total privacy budget using adaptivity and early-stopping.

Current DP DL techniques require a user to specify a number of queries (e.g., gradient descent update) to perform in advance and privacy budget to consume in advance. If one were to stop earlier in the training process, the current DP DL techniques do not provide better privacy guarantees than if the training went through all queries. Further, the current DP DL techniques do not allow the privacy loss budget consumed to change after the training process has begun. Embodiments herein overcome these limitations of the current odometer, such as by using an odometer with a nested privacy filter structure as opposed to an odometer with a stacked privacy filter structure and tracking the size of the nested privacy filter structure. The nested filter structure can grow at an exponential rate, whereas the stacked filter structure grows at a linear rate. The nested privacy filter structure is better suited for DL than the stacked privacy filter structure.

FIG. 1 illustrates, by way of example, a diagram of a device 102 and a server 104 configured to implement DP DL. The DP DL can be adaptive or non-adaptive. The device 102 or server 104 can, alone or in combination, perform the DP DL operations, such as by using a DP DL application 110A, 110B. The device 102 can communicate with the server 104 through the network 106. The network 106 can include a local area network (LAN), wide area network (WAN), the Internet, or other network.

The device 102 and server 104 as illustrated include processing circuitry 108A and 108B, respectively. The processing circuitry 108A, 108B includes software, hardware, firmware, or a combination thereof configured to implement the operations of the DP DL application 110A, 110B, respectively. The processing circuitry 108A can include electric or electronic components configured to implement one or more operations of the DP DL application 110A, 110B. The electric or electronic components can include one or more transistors, resistors, capacitors, diodes, inductors, oscillators, logic gates (e.g., AND, OR, XOR, negate, buffer, or the like), multiplexers, switches, amplifiers, memories, processing units (e.g., central processing units (CPUs), graphics processing units (GPUs), field programmable gate arrays (FPGAs), application specific integrated circuits (ASICs), or the like), analog to digital converters, power supplies, digital to analog converters, or the like.

The device 102 can provide functionality of the application 110A or can access functionality of the application 110B. The application 110A, 110B is the same, but the manner of application 110A, 110B access is different from the perspective of the device 102. The device 102 can access the functionality of the DP DL application 110A through its own processing circuitry 108A. The device 102 can access the functionality of the DP DL application 110B through a web browser 112.

The web browser 112 can issue a request to the server 104. The request to the server 104 can be issued over the network 106. Results of the DP DL application 110B, such as a classification, a DP DL model, or the like, can be provided to the device 102 through the network 106.

The DP DL application 110A, 110B provides DL with bounded privacy loss. The DP DL application 110A, 110B can help guarantee a user that the data used to train a DL model remains private. The DP DL application 110A, 110B can allow a user to specify a maximum allowable privacy loss, such as through a user interface 118. A DL model generated by the DP DL application 110A, 110B can be guaranteed to be within the allowed privacy loss specified by the user. Details regarding privacy filter, adaptive privacy filter, odometer, and adaptive fine-tuning are provided elsewhere.

The user interface 118 can provide a user an ability to specify a privacy loss budget through a privacy loss budget software control 120. The user interface 118 can provide a user an ability to specify a target model accuracy through a model accuracy software control 122. The user interface 118 provides a user with DP control of training a DL model, such as from scratch or in fine-tuning a pre-trained model.

The DP DL application 110A, 110B can use an adaptive privacy filter 114, odometer 116, or a combination thereof to ensure that the privacy loss specified by the user through the privacy loss budget software control 120 is not violated. The adaptive privacy filter 114 allows a user to consume less privacy loss while learning of the DL model is improving at a specified rate (e.g., while a standard deviation, average, variance, or other parameter of the learning is above (or at) a specified threshold). The specified rate is discussed in more detail elsewhere. The specified rate can help ensure that the higher learning progress is from some mechanism other than the DP noise added to the data. While the learning of the DL model is improving at the specified rate (or greater), the noise added by the adaptive privacy filter 114 to training data can be (e.g., iteratively) increased, the batch size of the input samples can be (e.g., iteratively) decreased in training during a given iteration, or a combination thereof. Such an adaptive privacy filter 114 provides a more accurate DL model with better controlled privacy loss.

The odometer 116 provides an ability to track privacy loss during training as it is consumed. The odometer 116 can leverage the adaptive privacy filter 114 to monitor and track privacy loss consumed. The odometer 116 can nest adaptive privacy filters 114 of different, variable sizes to allow only privacy loss consumed to be counted against the total privacy loss.

With prior odometers, the privacy filter structure used for variable privacy loss was limited. The limitations are from, at least in part, a replication of a same size privacy filter that bounded a maximum privacy loss at a given iteration. The replication of the same size filter allowed for stacking the fixed size privacy filter but provided insufficient flexibility in specifying an amount of privacy loss. The privacy loss had to be an integer multiple of the privacy loss of the privacy filter that was stacked. The odometer 116 herein allows a user flexibility to specify privacy losses other than the integer multiples of the privacy filter loss by using a sort of nested structure, rather than a stacked structure.

With the stacked structure, a new privacy filter was instantiated and "stacked" on a privacy filter that had its privacy budget consumed such that the privacy loss of a next iteration of training would overflow the privacy filter. The unused privacy loss of the stacked privacy filters is not re-gained or accounted for in the stacked structure.

With the nested structure, a privacy filter with a variable filter budget can be instantiated and the privacy loss consumed by the privacy filter can be constrained to the actual privacy loss consumed by training the DL model. In the odometer pseudocode provided and explained in more detail below the operation $$f = \operatorname*{argmin}_{g} \{FILT_{\alpha, \epsilon_{RDP}}(\epsilon_1(\alpha), \ldots, \epsilon_i(\alpha), 0, \ldots, 0) \neq \text{PASS}\}$$

corresponds to the nested structure and allows the odometer to consider only consumed privacy loss budget in a total privacy loss determination.

Figure 2:
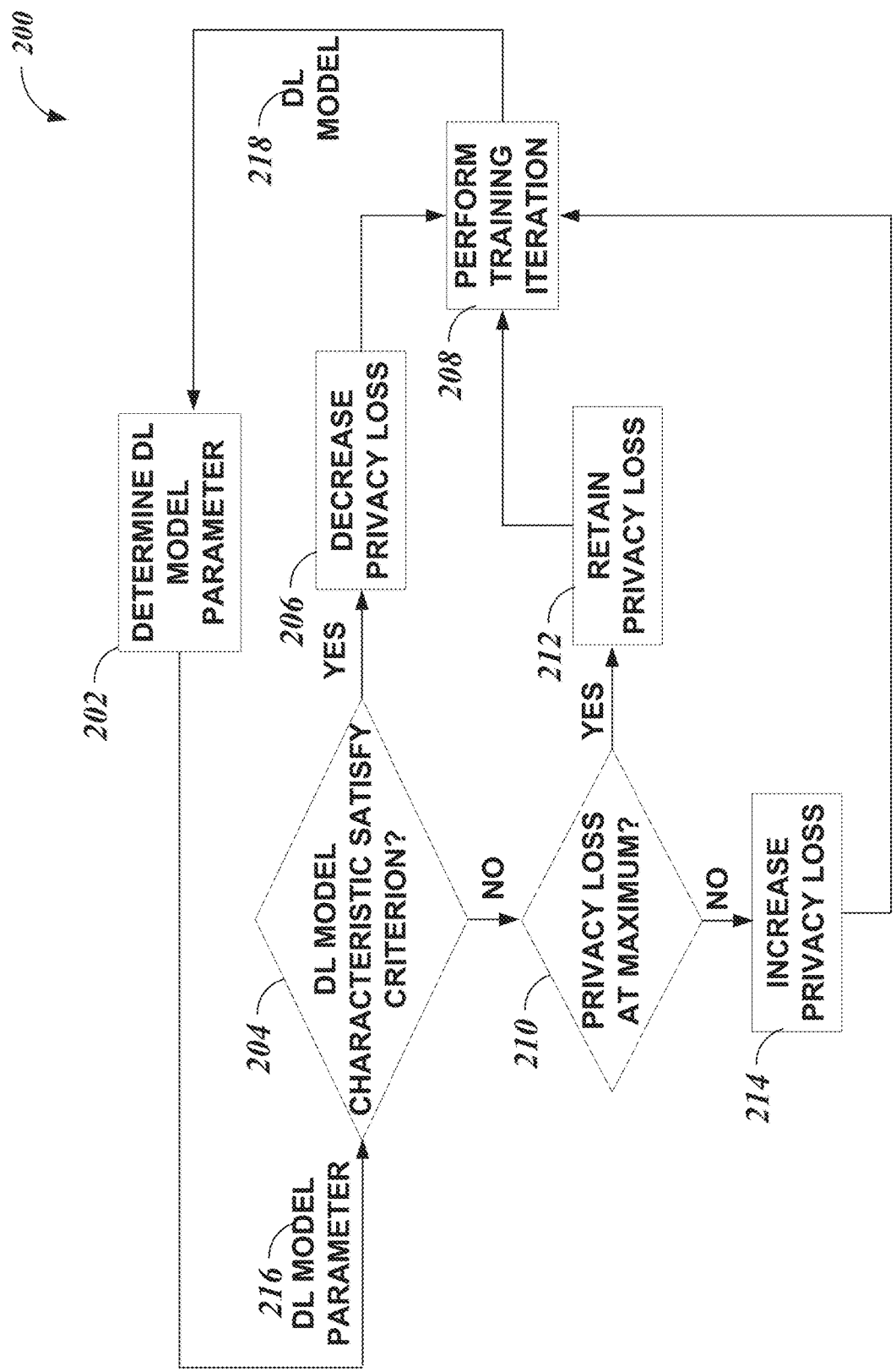
FIG. 2 illustrates, by way of example, a flow diagram of an embodiment of a technique for DP DL operation with an adaptive privacy filter.

FIG. 2 illustrates, by way of example, a diagram of an embodiment of a method 200 for DP DL operation with an adaptive privacy filter, such as the privacy filter 114. The method 200 can be performed during DL model training. A user typically specified in advance parameters of the privacy filter, number of queries (number of gradient training steps), and parameters of the DL model. The method 200 as illustrated, includes determining a DL model characteristic at operation 202. The DL model characteristic can include a training set or testing set accuracy (number of correct classifications in a sample divided by number of total number of samples), a difference in training or testing set accuracy from a prior training set or testing set accuracy greater than a specified threshold, or the like of a DL model 218. Determining the DL model characteristic is determined using a differentially private query that consumes some privacy loss budget. The prior training or testing set accuracy can be the training set or testing set accuracy from an immediately previous iteration (or epoch). An epoch is a specified number of training iterations (e.g., one, two, three, four, five, ten, twenty, a greater integer, or some integer therebetween).

At operation 204, it can be determined whether the DL model characteristic 216 satisfies a criterion. The DL model characteristic 216, as mentioned, can be a training set or testing set accuracy, a difference between sequentially determined test accuracies, or the like. The criterion can include a training set or testing set accuracy above a specified threshold (e.g., 70%, 75%, 80%, 85%. 90%, 95%, a greater or lesser percentage, or some percentage therebetween), a difference in sequential training set or testing set accuracy above a specified threshold that is a positive number constant (e.g., 1, 2, 3, a greater or lesser number, or a number therebetween) times a standard deviation of the training set or testing set accuracy, a combination thereof, or the like.

If the DL model characteristic 216 is determined, at operation 204, to satisfy the criterion, the privacy loss for the next iteration can be decreased at operation 206. Decreasing the privacy loss can include adding (more) noise to the training data, decreasing the batch size of samples used in training, a combination thereof, or the like. If the DL model characteristic 216 is determined, at operation 204, to not satisfy the criterion, it can be determined whether the privacy loss is at a maximum value at operation 210.

The DP DL application 110A, 110B can allow a user to specify a maximum or minimum privacy loss per training iteration (or epoch). The DP DL application 110A, 110B can additionally, or alternatively allow a user to specify a total overall maximum privacy loss to be consumed in training the DL model 218. If it is determined, at operation 210, the privacy loss is at a maximum allowed, the currently set privacy loss can be retained at operation 212. The operation 212 can include setting the privacy loss of a next iteration (or epoch) to the privacy loss of the previous iteration (or epoch). If the privacy loss is not at a maximum, as determined at operation 210 and the DL model characteristic 216 does not satisfy the criterion, as determined at operation 204, then the privacy loss can be increased at operation 214. Increasing the privacy loss can include reducing the noise added to the training data, increasing the batch size of samples used for training, a combination thereof, or the like.

At operation 208, a next training iteration can be performed (if the model is not accurate enough and if there is privacy loss budget available). The DL model 218 can be tested after the training iteration to perform operation 202. The DL model 218 can be tested on some test samples to determine its classification accuracy, difference in classification accuracy from a prior test, standard deviation, variance, or other measure of amount of change in training set or testing set accuracy from one or more prior tests, a combination thereof, or the like. The DL model characteristic 216 from operation 202 can be provided to the operation 204 and used to determine how to adaptively adjust privacy loss incurred in training the ML model.

Figure 3:
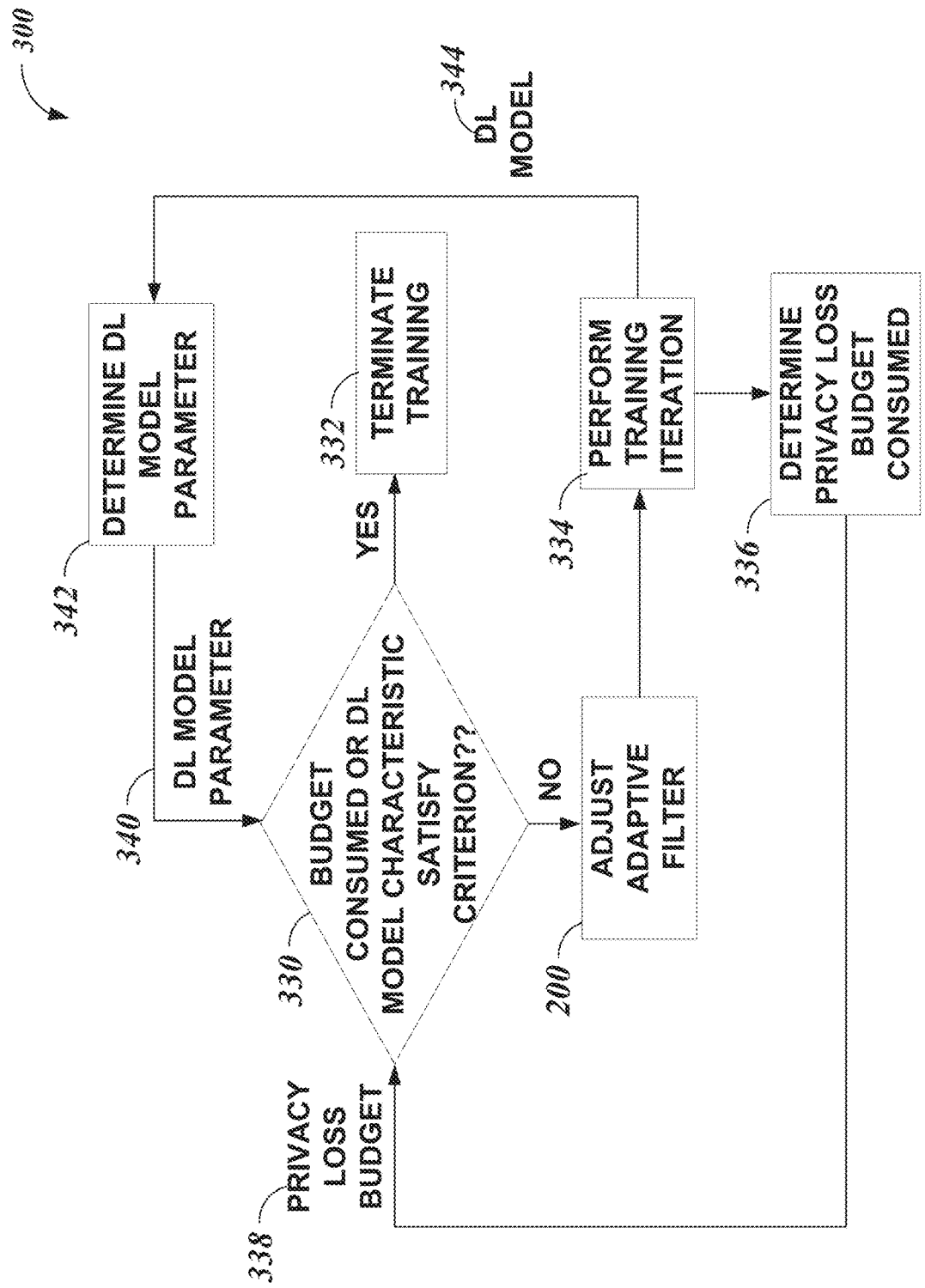
FIG. 3 illustrates, by way of example, a flow diagram of an embodiment of a technique for odometer operation in DP DL model fine-tuning.

FIG. 3 illustrates, by way of example, a diagram of an embodiment of a method 300 for odometer usage in DP DL model 344 generation. The method 300 is useful for, among other applications, fine-tuning the DL model 344 such that the fine-tuning training data has a DP guarantee.

The method 300 as illustrated includes determining, at operation 330, whether either a privacy loss budget 338 is consumed or DL model characteristic 340 satisfies a criterion. If the privacy loss budget 338 is consumed, the training of the DL model 344 can be terminated, at operation 332. If the DL model characteristic 340 satisfies the criterion, the training of the DL model 344 can be terminated, at operation 332. The DL model characteristic 340 can be an overall accuracy of the DL model 344.

If the privacy loss budget 338 is not consumed and the DL model characteristic 340 is not satisfied, as determined at operation 330, the method 300 can adjust an adaptive privacy loss of the DP DL model training, such as by performing at least a portion of the method 200. The method 200 is illustrated in FIG. 2 and described above.

If the privacy loss budget 338 is not consumed and the DL model characteristic 340 is not satisfied, as determined at operation 330, an iteration (or epoch) of training the DL model 344 can be performed, at operation 334. The iteration of training can include providing training samples that have known classifications to the DL model 344, operating the DL model 344 to determine a classification for the training sample, and backpropagating adjustments to weights of the DL model 344 based on the classification and known classification. More details regarding general ML model training are provided elsewhere.

At operation 336, an amount of privacy loss budget 338 consumed can be determined. The method 200 can use the remaining privacy loss budget 338 to determine an amount of noise, batch size, or a combination thereof to be used in performing operation 334. The operation 336 can include subtracting an amount of privacy loss budget consumed in performing the operation 334 from a variable that indicates the privacy loss budget remaining at an immediately prior iteration (or epoch) to generate the remaining privacy loss budget 338.

Operation 342 can be the same or different as the operation 202. The operation 342 can include determining an overall training set or testing set accuracy of the DL model 344.

The method 300 provides the ability to terminate training if (i) the privacy loss budget (as specified by the user) is consumed or (ii) the DL model is sufficiently accurate (as specified by the user). Sometimes, DL model accuracy can be reduced with additional training (see FIGS. 5A and 5C, for example). If, at operation 342, it is determined that the accuracy is decreasing, the DL model can be reverted to the state it was in immediately prior to the decrease in accuracy. The DL model 344 with the higher accuracy, and that consumed less privacy loss budget 338, in training can be provided.

A summary of approximate DP and Rényi DP is now provided. Specific results on adaptive composition are discussed and compared throughout.

DP is a randomized mechanism M: $\mathcal{D} \to \mathcal{R}$ that satisfies ($\epsilon$, $\delta$)-DP when, for any neighboring datasets D and D' in $\mathcal{D}$, and for any $S \subset \mathcal{R}$:

$$P(M(D) \in S) \le e^{\epsilon} P(M(D') \in S) + \delta \quad \text{Equation 1}$$

This definition depends on the notion of neighboring datasets, which can be domain specific but is typically chosen as the addition or removal of one data point. Since the neighboring relation is symmetric, the DP inequality is also symmetric. A smaller privacy budget $\epsilon > 0$ implies stronger guarantees, as one draw from the output gives little information about whether it ran on D or D'. When $\delta = 0$, the guarantee is called pure DP, while $\delta > 0$ is a relaxation of pure DP called approximate DP.

A useful way of rephrasing the DP guarantee is to define the privacy loss as, for $m \in \mathcal{R}$:

$$\text{Loss}(m) = \left( \frac{P(M(D) = m)}{P(M(D') = m)} \right) \quad \text{Equation 2}$$

If with probability at least $(1-\delta)$ over $m \sim M(D)$:

$$|\text{Loss}(m)| \le \epsilon \quad \text{Equation 3}$$

Then the mechanism M is ($\epsilon$, $\delta$)-DP. In this formulation, $\epsilon$ is a bound on the privacy loss. Approximate DP allows for $\delta > 0$ failure probability on that bound.

Composition is a property of DP. Composition theorems bound a total privacy loss incurred over a sequence of DP computations. Composition is useful both as a low level tool for technique design, and to account for the privacy loss of repeated data analyses performed on the same dataset. Basic composition states that a sequence $M_i$ of ($\epsilon_i$, $\delta_i$)-DP mechanisms is ($\Sigma \epsilon_i$, $\Sigma \delta_i$)-DP. While not efficient, it is simple and provides an intuitive notion of additive privacy budget consumed by DP computations.

Strong composition provides a tighter bound on privacy loss, showing that the same sequence is ($\epsilon_g$, $\delta_g$)-DP with $$\epsilon_g = \sqrt{2 \log\left(\frac{1}{\hat{\delta}}\right) \sum \epsilon_i^2} + \sum \epsilon_i(e^{\epsilon_i} - 1)$$

and $\delta_g = \hat{\delta} + \Sigma \delta_i$. This result includes some drawbacks. Each mechanism $M_i$ comes with its own tradeoff between $\epsilon_i$ and $\delta_i$, and there is no practical way to track and optimally compose under these trade-offs. This has led to multiple special purpose composition theorems, such as the moment accountant for DP DL. Strong composition results also include the sequence of DP parameters to be fixed in advance.

Rényi DP (RDP) is a relaxation of pure DP that implies approximate DP. RDP expresses a privacy guarantee using Rényi divergence as in Equation 4.

$$D_\alpha(P \| Q) \triangleq \frac{1}{(\alpha - 1)} \log \mathbb{E}_{x \sim Q} \left( \frac{P(x)}{Q(x)} \right)^\alpha \quad \text{Equation 4}$$

Where $\alpha \in [1, +28]$ is the order of the divergence. A randomized mechanism M is $(\alpha, \epsilon)$-RDP if:

$$D_\alpha(M(D) \| M(D')) \leq \epsilon \quad \text{Equation 5}$$

A sequence of $(\alpha, \epsilon_i)$-RDP mechanisms is $(\alpha, \Sigma\epsilon_i)$-RDP. RDP reintroduces an additive privacy budget $\epsilon$ at each order $\alpha$.

Tracking the RDP budget over multiple orders enables one to account for the specific trade-off curves of each specific mechanism in a sequence of computations. For an $(\alpha, \epsilon)$-RDP mechanism:

$$P_{m \sim M(D)}\left(|\text{Loss}(m)| > \epsilon + \log\left(\frac{1}{\delta}\right)/(\alpha - 1)\right) \leq \delta \quad \text{Equation 6}$$

Which implies $$\left(\epsilon + \log\left(\frac{1}{\delta}\right)/(\alpha - 1), \delta\right) - DP$$

Although RDP composition is similar to strong composition in the worst case, tracking privacy loss over the curve of Rényi orders often yields smaller privacy loss bounds in practice.

Privacy Filters

Privacy filters authorize the composition of adaptive DP budgets within an upper-bound on a privacy fixed a priori. That is, a budget of the sequence of computations is not known in advance and can depend on previous results. The privacy filter helps ensure that the upper-bound is always valid.

Complex sequences of interactions with the data, such as the adaptive privacy budget interactions can be challenging to precisely express. The adaptive privacy budget interactions are expressed in the form of a technique that describes the power and constraints of an analyst, or adversary interacting with the data.

Specifically, an adversary A will interact for k rounds in one of two neighboring worlds indexed by $b \in \{0,1\}$. Note that k does not appear in the bounds and can be chosen to be arbitrarily large. Typically, the two worlds represent two neighboring datasets with an observation added or removed. This formulation allows for more flexibility by letting A choose two neighboring datasets at each round, as well as the DP mechanism to use (and its RDP parameters). Each decision can be made conditioned on the previous results.

An RDP filter, $\text{FILT}_{\alpha,\epsilon_{RDP}}$ of order $\alpha$ can pass on a computation at any time, setting $\epsilon_i = 0$ and returning $\bot$ to A. Instantiating the filter to provide RDP and DP guarantees is discussed elsewhere herein. The output of the filter can include a view of results from the computations, $V^b = (v_1, \ldots, v_k)$. With a slight abuse of notation, $V_i^b$ is the distribution over possible outcomes for the $i^{th}$ query, and $v_i \sim V_i^b$ an observed realization.

With this notation, the dependencies of distribution of the $i^{th}$ query can be represented as $V_i^b(v_i | v_{\leq i-1})$, where $v_{\leq i}$ is the view of all realized outcomes up to, and including the $i^{th}$ query. Similarly, the joint distribution over possible views is, $V^b(v_{\leq n})$. A budget of the $i^{th}$ query, $\epsilon_i$ depends only on all queries up the previous one, which is notes as $\epsilon_i(v_{\leq i-1})$. DP seeks to bound the information about b that A can learn from the results of its DP computations. Following Equation 2, a desire is to keep, with high probability, the bound under $v \sim V^0$ the privacy loss incurred by the sequence of computations $|\text{Loss}(v)| = |\log((V^0(v_{\leq n}))/(V^1(v_{\leq n}))|$.

A pseudocode version of a privacy filter composition is provided:

---
Privacy Filter Composition

Inputs: (A, k, b, $\alpha$; $\text{FILT}_{\alpha,\epsilon_{RDP}}$)
  for i = 1, ... , k do
    A = A($v_1$, ... , $v_{i-1}$) gives neighboring $D_i^0$, $D_i^1$, $\epsilon_i$, and $M_i$: $\mathcal{D} \to \mathcal{R}$ and $(\alpha, \epsilon_i)$-RDP mechanism
    if $\text{FILT}_{\alpha,\epsilon_{RDP}}$ ($\epsilon_1$, ... , $\epsilon_i$, 0, ... ,0) = Pass then
      $\epsilon_i = 0$
      A receives $v_i = V_i^b = \bot$
    Else
      A receives $v_i \sim V_i^b = M_i(D_i^b)$
    End if
  End for
Output view $V^b = (v_1, \ldots, v_k)$.

---

This filter passes when $$\sum_i \epsilon_i > \epsilon_{RDP} \quad \text{Equation 7}$$

That is, the filter passes when the new query will cause the sum of all budgets used so far to go over ERDP. This filter helps ensure that the technique is $(\alpha, \epsilon_{RDP})$-RDP.

What follows is a mathematical proof that the interaction mechanism from the pseudocode, instantiated with the filter from Equation 7 is $(\alpha, \epsilon_{RDP})$-RDP. That is: $D_\alpha(V^0 \| V^1) \leq \epsilon_{RDP}$.

Proof:

$D_\alpha(V^0 \| V^1)$ can be written as:

$$e^{(\alpha-1)D_\alpha(V^0\|V^1)} = \int_{\mathcal{R}_1 \ldots \mathcal{R}_n} (V^0(v_{\leq n}))^\alpha (V^1(v_{\leq n}))^{1-\alpha} dv_1 \ldots dv_n$$

$$= \int_{\mathcal{R}_1} (V^0(v_{\leq n}))^\alpha (V^1(v_{\leq n}))^{1-\alpha} \ldots$$

$$\int_{\mathcal{R}_n} (V^0(v_n | v_{\leq n-1}))^\alpha (V^1(v_n | v_{\leq n-1}))^{1-\alpha} dv_1 \ldots dv_n.$$

An inner-most integral can be represented as:

$$\int_{\mathcal{R}_n} (V^0(v_n | v_{\leq n-1}))^\alpha$$

$$(V^1(v_n | v_{\leq n-1}))^{1-\alpha} dv_n \leq e^{(\alpha-1)\epsilon_n v_{\leq n-1}} \leq e^{(\alpha-1)(\epsilon_{RDP} - \sum_{i=1}^{n-1}\epsilon_i(v_{\leq i-1}))},$$

Where the first inequality follows because $M_n$ is $(\alpha, \epsilon_n(v_{\leq n-1}))$-RDP. The second inequality follows because the privacy filter enforces that $\Sigma_{i=1}^n \epsilon_i \leq \epsilon_{RDP} \Rightarrow \epsilon_i \leq \epsilon_{RDP} - \Sigma_{i=1}^n \epsilon_i$ since $\epsilon_i \geq 0$.

Note that the inner most integral is now bounded by a function of $v_{\leq n-2}$ and not $v_{\leq n-1}$. Thus, the following holds:

$$e^{(\alpha-1)D_\alpha(V^0\|V^1)} \leq \int_{\mathcal{R}_1} (V_1^0(v_1))^\alpha (V_1^1(v_1))^{1-\alpha}$$

-continued $$\int_{\mathcal{R}_{n-2}} (V_{n-2}^0(v_{n-2} \mid v_{\leq n-3}))^\alpha (V_{n-2}^1(v_{n-2} \mid v_{\leq n-3}))^{1-\alpha} \{e^{(\alpha-1)(\epsilon_{RDP} - \sum_{i=1}^{n-1} \epsilon_i(V_{\leq i-1}))}$$

$$\int_{\mathcal{R}_{n-1}} (V_{n-1}^0(v_{n-1} \mid V_{\leq n-2}))^\alpha (V_{n-1}^1(v_{n-1} \mid v_{\leq n-2}))^{1-\alpha} dv_{n-1} \} dv_{n-2} \ldots dv_1 \leq$$

$$\int_{\mathcal{R}_1} (V_1^0(v_1))^\alpha (V_1^1(v_1))^{1-\alpha} \ldots \int_{\mathcal{R}_{n-2}} (V_{n-2}^0(v_{n-2} \mid v_{\leq n-3}))^\alpha (V_{n-2}^1(v_{n-2} \mid V_{\leq n-3}))^{1-\alpha}$$

$$\left\{ e^{(\alpha-1)\left(\epsilon_{RDP} - \sum_{i=1}^{n-1} \epsilon_i(v_{\leq n-1})\right)} e^{(\alpha-1)\epsilon_{n-1}v_{\leq n-2}} \right\} dv_{n-2} \ldots dv_1 \leq e^{(\alpha-1)\epsilon_{RDP}}$$

Where the first inequality takes the previous bound out of the integral as it is a constant with respect to $v_{n-1}$. The second inequality comes from $M_{n-1}$ being $(\alpha, \epsilon_{n-1}(v_{\leq n-2}))$-RDP, and the equality combines the two exponentials and cancels $\epsilon_{n-1}$ in the sum. The term in the brackets is now only a function of $v_{\leq n-3}$ and not $v_{\leq n-2}$. This last inequality recursively applies the same reasoning to each integral, removing all $\epsilon_i$. Taking the log of each side of the global inequality concludes the proof.

A feature of RDP is the ability to compose mechanisms over the whole $(\alpha, \epsilon)$ curve. Since, for some mechanisms, this curve is not linear, it is unclear in advance which $\alpha$ will yield an optimal $(\epsilon, \delta)$-DP guarantee (through Equation 6. This composition "over all $\alpha$s" can help enable strong composition results of RDP.

The privacy filter discussed previously can be extended to this case. Consider a sequence (e.g., possibly infinite sequence) of $\alpha$ values to track, noted $\Lambda$, and an upper bound $\epsilon_{RDP}(\alpha)$ for each of these values. In the pseudocode, the mechanism $M_i$ is now $(\alpha, \epsilon_i(\alpha))$-RDP for $\alpha \in \Lambda$. The filter $\text{FILT}_{\alpha, \epsilon_{RDP}(\alpha)}(\epsilon_1(\alpha), \ldots, \epsilon_i(\alpha), 0, \ldots, 0)$ will PASS when:

$$\forall \alpha \in \Lambda, \sum_i \epsilon_i(\alpha) > \epsilon_{RDP}(\alpha) \quad \text{Equation 8}$$

An RDP filter over the Rényi curve is possible. The interaction mechanism from the pseudocode, instantiate with the filter from Equation 8 is such that $\exists \alpha$: $D_\alpha(V^0 \| V^1) \leq \epsilon_{RDP}(\alpha)$. This can be shown by simple contradiction.

An application of an RDP filter over the Rényi curve is a privacy filter that enforces an $(\epsilon_{DP}, \delta)$-DP guarantee and leveraging RDP to ensure strong composition. Intuitively, for each $\alpha$ the corresponding $\epsilon_{RDP}(\alpha)$ can be set to the value which, for this $\alpha$, implies a desired $(\epsilon_{DP}, \delta)$-DP target. Formally, based on Equation 6 the filter from Equation 8 can be set to $\forall \alpha \in \Lambda$:

$$\epsilon_{RDP}(\alpha) = \epsilon_{DP} - \log \frac{\frac{1}{\delta}}{\alpha - 1}.$$

Using this filter with the pseudocode makes the pseudocode implementation $(\epsilon_{DP}, \delta)$-DP.

This is significant at least because this technique yields strong DP composition with a simple additive RDP privacy filter. There is no overhear compared to non-adaptive RDP, which yields tighter results than DP strong composition in many practical settings, such as the composition of Gaussian mechanisms ubiquitous in DP DL. Other solutions include increased overhead and are restricted to DP strong.

Privacy filters are useful to support sequences of computations with adaptive privacy budgets, under a fixed total privacy loss. In many cases however, a more flexible setup is desired in which one can also stop at any time and bound the privacy loss of the realized sequence. Examples of such use-cases include early stopping when training or fine-tuning deep learning models, "accuracy first" machine learning, or an analyst interacting with the data until a particular question is answered.

A second pseudocode formalizes a privacy odometer setup. The adversary A can now interact with the data in an unrestricted fashion. For the given RDP order $\alpha$, the odometer returns a view, stops filter, and provides the spent budget. The spent budget is an upper bound on $D_\alpha(V^0(v_{\leq i}) \| V^1(v_{\leq i}))$ since the interaction can stop at any time.

Odometer pseudocode
    for i = 1, ..., k do
        A = A(v_1, ..., v_{i-1})
        A gives neighboring $D_i^0$, $D_i^1$, $\epsilon_i$, and $M_i$: $\mathcal{D} \to \mathcal{R}$ an $(\alpha, \epsilon_i)$-RDP mechanism
        $f = \text{argmin}_g \{FILT_{\alpha, \epsilon_{RDP}}(\epsilon_1(\alpha), \ldots, \epsilon_i(\alpha), 0, \ldots, 0) \neq \text{PASS}\}$
        A receives $v_i \sim V_i^b = M_i(D_i^b)$
    end for
    output view $V^b = (v_1, \ldots, v_k)$, stopping filter f, and spent budget $\epsilon_{RDP}^{tot} = \epsilon_{RDP}^f$ Analyzing such an unbounded interaction directly with RDP is challenging, as the RDP parameters can change at each step based on previous realizations of the random variable, and there is no limit enforced on their sum. This challenge can be handled by initiating the odometer with a sequence of $\epsilon_{RDP}^f$ with $f \in \mathbb{N}_1$ a strictly positive integer.

After each new RDP computation, the smallest $f$ such that a filter $\text{FILT}_{\alpha, \epsilon_{RDP}^f}$ initiated with budget $\epsilon_{RDP}^f$ would not PASS can be determined. The privacy guarantees of this construction can be analyzed and the construction can be extended to support RDP accounting over the Rényi curve.

Both of these are discussed and an instantiation of $\epsilon_{RDP}^{f \in \mathbb{N}_1}$ to get efficient odometers is explained.

Analysis of the odometer pseudocode can be aided through use of a truncation parameter $\text{trunc}_{\leq f}$, which changes the behavior of an adversary A to match that of a privacy filter of size $\epsilon_{RDP}^f$. Intuitively, $\text{trunc}_{\leq f}(A)$ follows A exactly until A outputs an RDP mechanism that causes a switch to the $(f+1)^{th}$ filter. When this happens, $\text{trunc}_{\leq f}(A)$ stops interacting until the end of the k queries. More precisely, at round i $\text{trunc}_{\leq f}(A)$ outputs the same $D_i^0$, $D_i^1$, $\epsilon_i$, and $M_i$ as A as long as $$f = \text{argmin}_g \{FILT_{\alpha, \epsilon_{RDP}}(\epsilon_1(\alpha), \ldots, \epsilon_i(\alpha), 0, \ldots, 0) \neq \text{PASS}\} \leq f.$$

Otherwise, $\text{trunc}_{\leq f}(A)$ returns $\epsilon_i=0$ and $M_i: x \to \bot$.

Similarly, note that $\text{trunc}_{\leq f}(V^b)$ is the distribution over possible views when adversary $\text{trunc}_{\leq f}(A)$ interacts following the odometer pseudocode and $\text{trunc}_{\leq f}(v)$ a corresponding truncation of a view generated by adversary A. This truncated adversary behaves like a privacy filter, yielding the following result. What follows is a proof that the interaction mechanism from the odometer pseudocode is such that $D_\alpha(\text{trunc}_{\leq f}(V^0) \| \text{trunc}_{\leq f}(V^1)) \leq \epsilon_{RDP}^f$.

The interaction from the Odometer pseudocode with $\text{trunc}_{\leq f}(A)$ is identical to that of the privacy filter composition pseudocode with $\text{trunc}_{\leq f}(A)$ initiated with $\text{FILT}_{\alpha, \epsilon_{RDP}^f}$, since the filter will never PASS. Thus, the statement follows from the proof associated with the privacy filter composition pseudocode.

Contrary to what is claimed by others, this result only holds for the truncated version of the odometer pseudocode and not for any realized sequence such that $\Sigma \epsilon_i \le \epsilon_{RDP}{}^f$. Indeed $D_\alpha(V^0 \| V^1)$ integrates over the whole space of possible output views, which can have budgets above $\epsilon_{RDP}{}^f$. Such a result without truncation would also imply a DP guarantee that violates the adaptive stopping lower bound proven in Rogers, R., Roth, A., Ullman, J., and Vadhan, S. Privacy Odometers and Filters: Pay-as-You-Go Composition. In NeurIPS, 2016.

The privacy loss of the Odometer pseudocode can be bounded. For a given outcome v and f of the interaction described in the Odometer pseudocode, $$P\left(|\mathrm{Loss}(v)| > \epsilon_{RDP}^f + \log\left(\frac{2f^2}{\delta}\right)/(\alpha-1)\right) \le \delta.$$

This implies that the interaction is $$\left(\epsilon_{RDP}^f + \log\frac{\frac{2f^2}{\delta}}{\alpha-1}, \delta\right) - DP.$$

A relationship between an interaction of the odometer pseudocode and its truncated version is now provided. Denote $\mathrm{PASS}_f$ the event that $\mathrm{trunc}_{\le f}(V^0)$ stopped, that is $\mathrm{trunc}_{\le f}(v)$ includes at least one $\bot$. Also denote $\mathcal{F}$ as the random variable from which $f$ is drawn (its randomness is from the randomness in both A and V).

Further note $\widetilde{\mathrm{Loss}}(\tilde{v}) = \log(P(\mathrm{trunc}_{\le f}(V^0) = \tilde{v})/P(\mathrm{trunc}_{\le f}(V^1) = \tilde{v}))$ is the privacy loss of an outcome $\tilde{v} \sim \mathrm{trunc}_{\le f}(V^0)$ in the truncated version of odometer pseudocode. Because truncation at $f$ does not change anything when $\mathcal{F} \le f$, then $$P(V^b = v \mid F \le f) = P(\mathrm{trunc}_{\le f}(V^b) = v \mid \neg \mathrm{PASS}_f) \Rightarrow$$
$$P(|\mathrm{Loss}(v)| > c \mid F \le f) = P(|\widetilde{\mathrm{Loss}}(\tilde{v})| > c \mid \neg \mathrm{PASS}_f) \Rightarrow$$
$$P(|\mathrm{Loss}(v)| > c, F \le f) = P(|\widetilde{\mathrm{Loss}}(\tilde{v})| > c, \neg \mathrm{PASS}_f)$$

Where the last inequality uses $P(F \le f) = P(\neg \mathrm{PASS}_f)$ by definition of the truncation operator and $\mathrm{PASS}_f$ event.

The privacy loss of the non-truncated interaction can be bounded as:

$$P\left(|\mathrm{Loss}(v)| > \epsilon_{RDP}^f + \log\left(\frac{2f^2}{\delta}\right)/(\alpha-1)\right) =$$
$$\sum_f P\left(|\mathrm{Loss}(v)| > \epsilon_{RDP}^f + \log\left(\frac{2f^2}{\delta}\right)/(\alpha-1), F = f\right) \le$$
$$\sum_f P\left(|\mathrm{Loss}(v)| > \epsilon_{RDP}^f + \log\left(\frac{2f^2}{\delta}\right)/(\alpha-1), F \le f\right) =$$
$$\sum_f P\left(|\widetilde{\mathrm{Loss}}(v)| > \epsilon_{RDP}^f + \log\frac{\frac{2f^2}{\delta}}{\alpha-1}, \neg \mathrm{PASS}_f\right) \le$$
$$\sum_f P\left(|\widetilde{\mathrm{Loss}}(v)| > \epsilon_{RDP}^f + \log\frac{\frac{2f^2}{\delta}}{\alpha-1}\right) \le \sum_f \delta/2f^2 \le \delta.$$

Where the second inequality follows from the previous step, and the penultimate inequality applies the $D_\alpha(\mathrm{trunc}_{\le f}(V^0) \| \mathrm{trunc}_{\le f}(V^1)) \le \epsilon_{RDP}{}^f$ with $\delta = \delta/2f^2$, and Equation 6.

Since the interaction is $$\left(\epsilon_{RDP}^f + \log\frac{\frac{2f^2}{\delta}}{\alpha-1}, \delta\right) - DP,$$

there is an RDP based bound on the privacy loss, with a penalty for providing a running upper-bound over the sequence of $\epsilon_{RDP}{}^f$. To fully leverage RDP strong composition, the RDP budge over the Rényi curve can be tracked. Applying a union bound shows that, for all $\alpha \in \Lambda$:

$$P\left(|\mathrm{Loss}(v)| > \epsilon_{RDP}^f + \log\left(\frac{|\Lambda| 2f^2}{\delta}\right)/(\alpha-1)\right) \le \delta \quad \text{Equation 9}$$

The budget spent by A is tracked by the odometer pseudocode over a set of RDP orders $\alpha \in \Lambda$, denoted $\epsilon_{RDP}(\alpha)$. When mapping this RDP consumption to a DP bound, for each $\alpha$, $f$ is found such that $$\epsilon_{RDP}(\alpha) \le \epsilon_{RDP}^f + \log\left(\frac{|\Lambda| 2f^2}{\delta}\right)/(\alpha-1)).$$

The minimum value on the right hand side over all orders is the upper bound on the privacy loss.

There are at least two choices to make when instantiating the odometer of the pseudocode. The first choice is that of $\epsilon_{RDP}(\alpha)$. At a given order $\alpha$, the best DP guarantee is $$\epsilon = \epsilon_{RDP}^f + \log\left(\frac{|\Lambda| 2f^2}{\delta}\right)/(\alpha-1).$$

Setting $$\epsilon_{RDP}^1(\alpha) = \log\left(\frac{|\Lambda| 2}{\delta}\right)/(\alpha-1)$$

ensures that a DP guarantee is provided within a factor of two of the lowest possible when $f=1$. Preserving this factor two upper-bound can include doubling the filter at every $f$, yielding:

$$\epsilon_{RDP}^f(\alpha) = 2^{f-1} \log\left(\frac{|\Lambda| 2}{\delta}\right)/(\alpha-1).$$

Note that a final DP guarantee is not a step function doubling at every step, as one can choose a best DP guarantee over all $\alpha$s in a posteriori.

Then the $\Lambda$ of RDP orders can be set to track with multiple considerations to balance. A final guarantee implied by Equation 9 can have a dependency on $\sqrt{\log(|\Lambda|)}$, so $|\epsilon_{DP}|$ cannot grow too large. A largest $\alpha$ can constrain a lowest possible DP guarantee. A minimum DP guarantee of $\epsilon_{DP} = 1/n^2$, where n is the size of the dataset, is always sufficient. This is because the result of a DP interaction has to be almost independent of the data at such an $\epsilon_{DP}$, rendering accounting at lower granularity meaningless. In this case, setting $\{\Lambda=2^i, i \in \{1, \log_2(n^2)\}\}$ yields the same optimal dependency on n as prior solutions. In contrast to prior solutions, a resulting odometer does not degrade for values $\epsilon_{DP} > 1$, making it more practical in situations where larger budgets are expected.

In practice, many applications have high DP cost which a minimal granularity of $1/n^2$ is too extreme. Such applications can benefit from a higher resolution of RDP orders in the relevant range, yielding a tighter RDP bound. This effect is very convenient due to the exponential discretization of the RDP budget spent at each order. By choosing the range of RDP orders $\Lambda$, one can trade off $\log(|\Lambda|)$ cost with an RDP order resolution and a minimum budget granularity. This convenience of adaptation combined with the efficient RDP accounting make the odometer provided herein the first to be practical enough to apply to DP DL. In the discussion and analysis that follows $\alpha = \{1.25, 1.5, 1.75, \ldots, 9.75, 10, 16, 32\}$ for all results. These are typical values used in RDP accounting for DL, with a slightly higher resolution than prior solutions.

Practical privacy filters and odometers open a new design space for DP, including in its applications to DL models. Some applications of both filters and odometer constructs for classification models on a dataset are provided. A goal is to show the promise of adaptive DP budgets to DL models.

Privacy filter applications are now discussed, followed by odometer applications. Intuitively, adaptivity can be used to save budget during training to perform more steps in total, increasing accuracy under a fixed total privacy loss. A common method to train DL models with DP is DP Stochastic Gradient Descent (DP-SGD), which clips gradients of individual data points to bound their influence on each SGD step, and adds Gaussian noise to the mini-batch's gradients to ensure that each parameter update is DP. Composition is then used to compute the total privacy loss incurred when training the model.

An adaptation policy can be constructed as follows. Starting from a non-adaptive baseline, every number of epochs (e.g., 1, 5, 10, 25, a greater or lesser number, or some number therebetween) a number of correctly classified train set images can be determined. Such a computation needs to be DP. One can use a Gaussian mechanism with standard deviation $\sigma=100$ for such. This budget can be accounted for in the total used to train the model. If the number of correctly classified examples increased by a specified number of standard deviations (e.g., one, two, three, a greater or lesser number, or a number therebetween), a "significant increase" that ensures this change is never due to the DP noise, the privacy budget used at each mini-batch for the next specified number epochs can be decreased. If no such significant increase is realized, the budget can be increased by a same or different amount, up to that of the non-adaptive baseline. The privacy budget can be lowered when the filter will allow more than 50 epochs under the current budget.

There are two main parameters in DP-SGD that influence the budget of each mini-batch computation: the size of the batch, and the standard deviation of the noise added to the gradients. A policy can be applied to each parameter separately. For the noise standard deviation, one can add or remove a specified amount (e.g., 0.1 or a greater or lesser value). For the batch size, one can add or remove a number (e.g., 32, 64, 128, 256, or other number) of data points in the mini-batch (with a minimum of 256), which is the size of sub-mini-batch used to build the final batch.

Figure 4A:
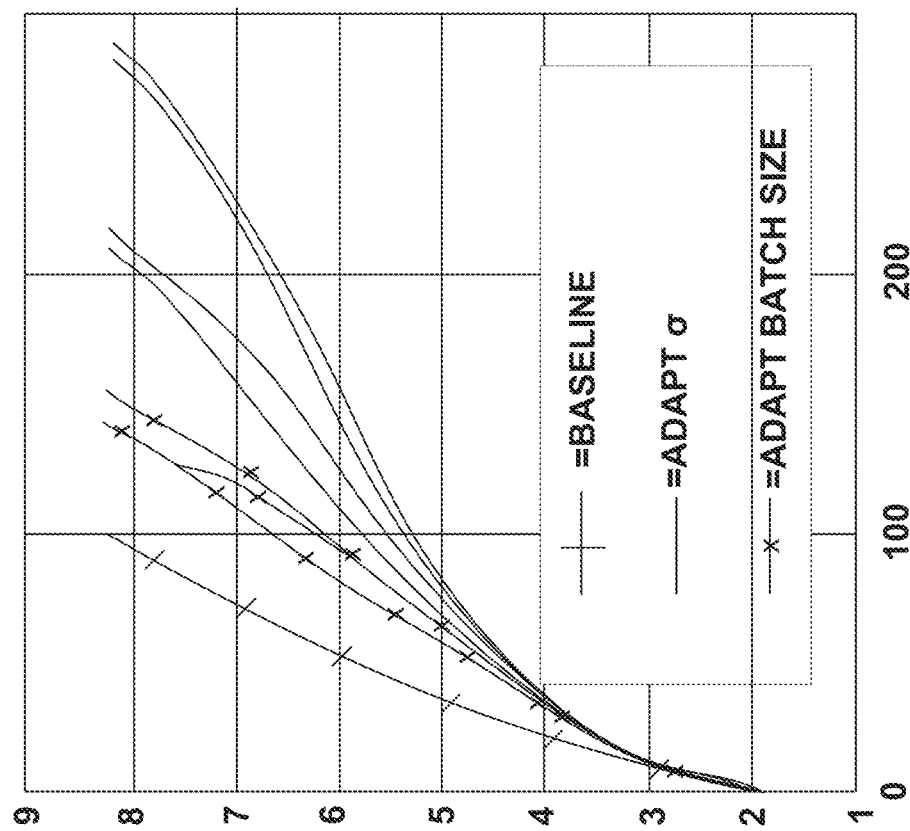
FIGS. 4A, 4B, 4C, 4D illustrate respective graphs of different parameters of training a DL DP model using a privacy filter discussed herein.
Figure 4B:
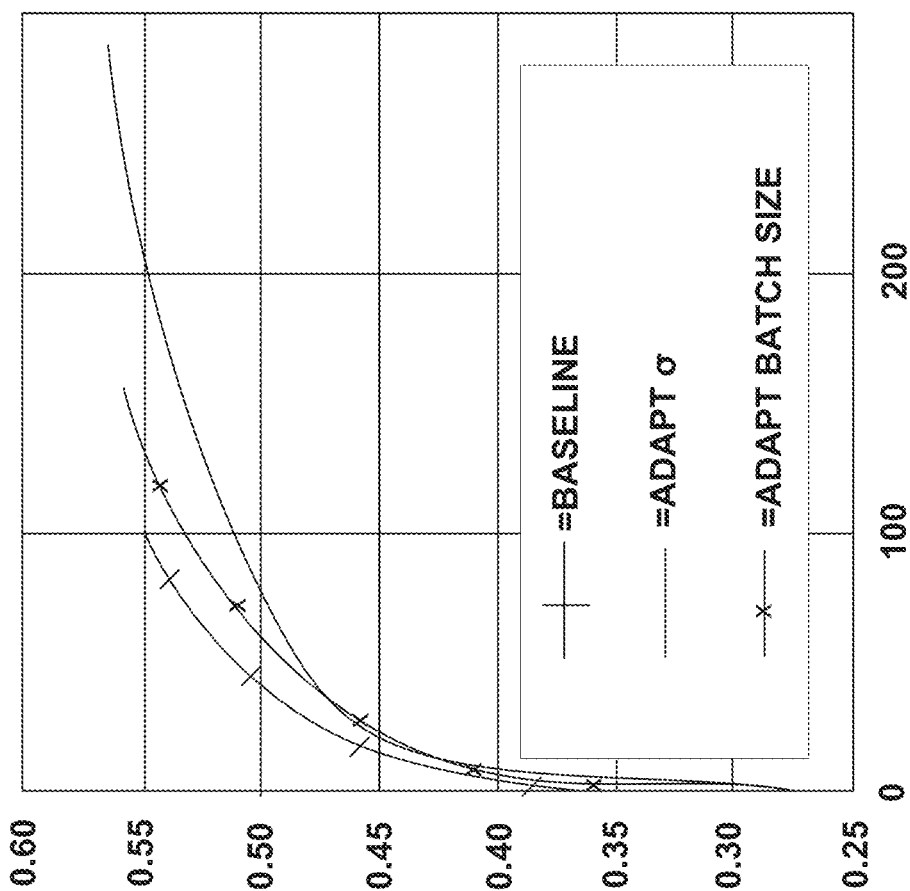
Figures 4C, 4D:
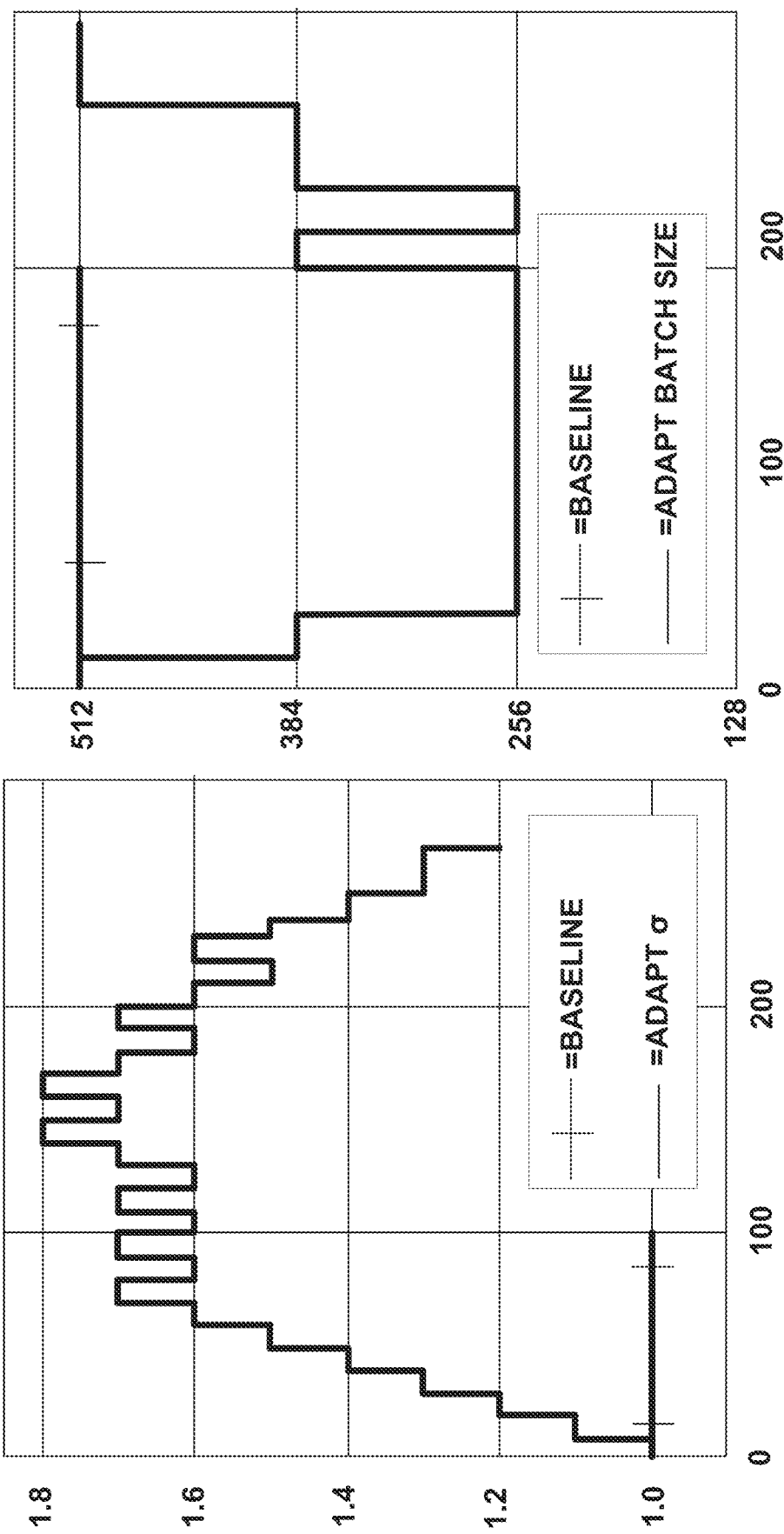

FIGS. 4A, 4B, 4C, 4D illustrate different parameters of training a DL DP model using a privacy filter discussed herein. FIG. 4A illustrates accuracy of the model over training iterations (epochs), FIG. 4B illustrates privacy budget consumed over training iterations, FIG. 4C illustrates noise added to data over training iterations, and FIG. 4D illustrates training batch size over training iterations.

FIGS. 4A-4D shows adaptive policies applied to a baseline ResNet9 model, trained for 100 epochs with a fixed learning rate of 0.05, gradient clipping of 1, DP noise $\sigma=1$, and batch size 512. BatchNorm layers were replaced with LayerNorm to support DP. As expected, the policy first decreases a privacy budget, increasing the noise (FIG. 4C) or decreasing the batch size (FIG. 4D). This translates to less consumption in DP budget (FIG. 4B) and longer training, up to 3× the number of epochs (and up to 15 hours vs 3.5 hours on one Tesla M60 Graphics Processing Unit (GPU)). When performance starts to plateau, the DP budget can be increased back to a specified level. Despite the slower start in accuracy, depicted in FIG. 4A, the end result is significantly better in terms of accuracy. Over 5 runs, the average accuracy of the baseline is 54.58% (min/max 53.40%/55.24%), while adapting the batch size yields 55.56% (54.93%/56.38%) and adapting noise 57.22% (56.96%/57.4%). The noise adaptation policy always performs better than the best baseline run, by more than 1.72% and with an average increase of 2.64%.

An application of privacy odometers is fine-tuning an existing model with DP, such that the privacy of the fine-tuning dataset in preserved. In this setup, acceptable performance is expected in a small but unknown number of epochs. Fine tuning can be stopped when the model reaches satisfactory accuracy on the new dataset (or stops improving), without incurring more privacy loss than allowed.

Figure 5B:
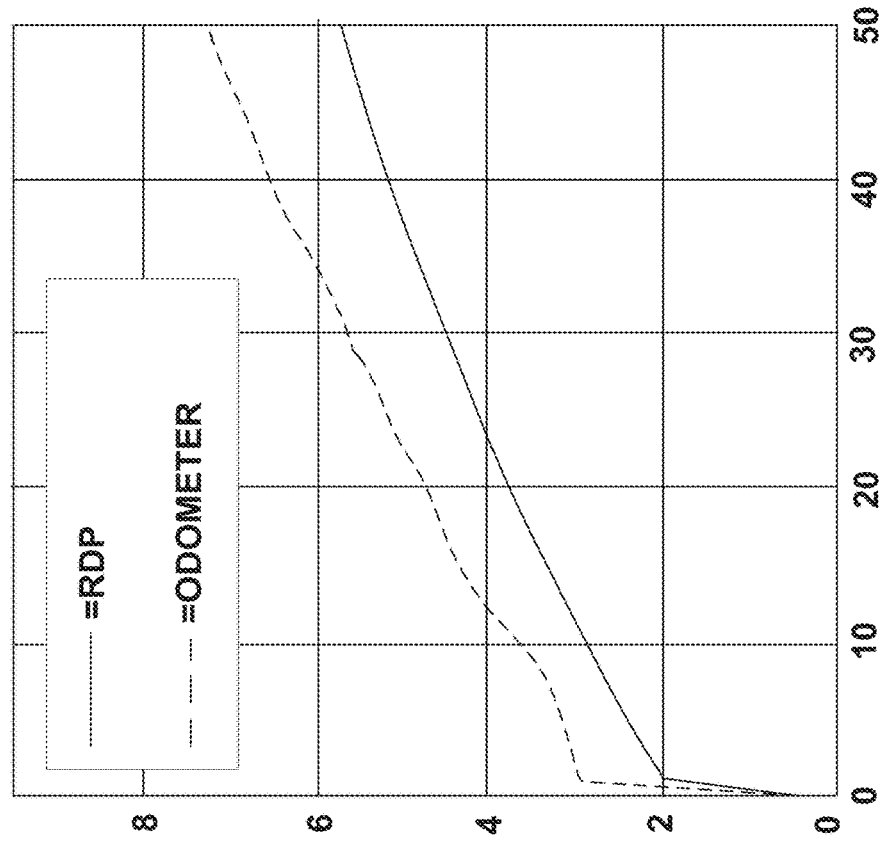
FIGS. 5A, 5B, 5C, 5D illustrate respective graphs of different parameters of fine tuning a DL DP model using an odometer discussed herein.
Figure 5A:
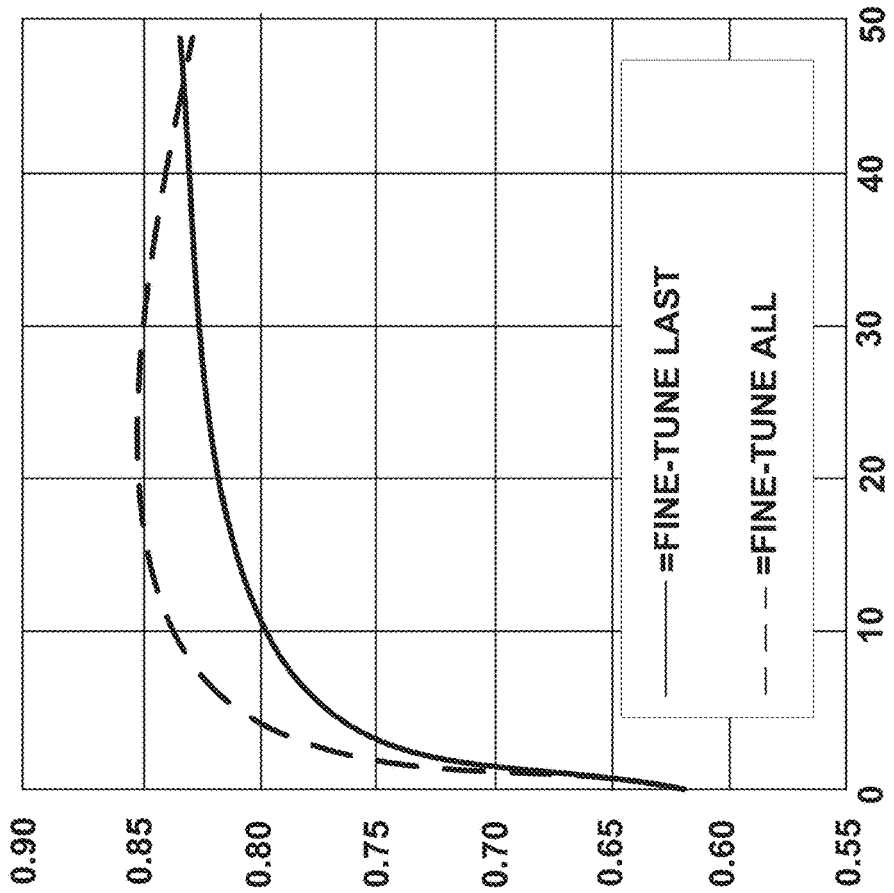
Figure 5D:
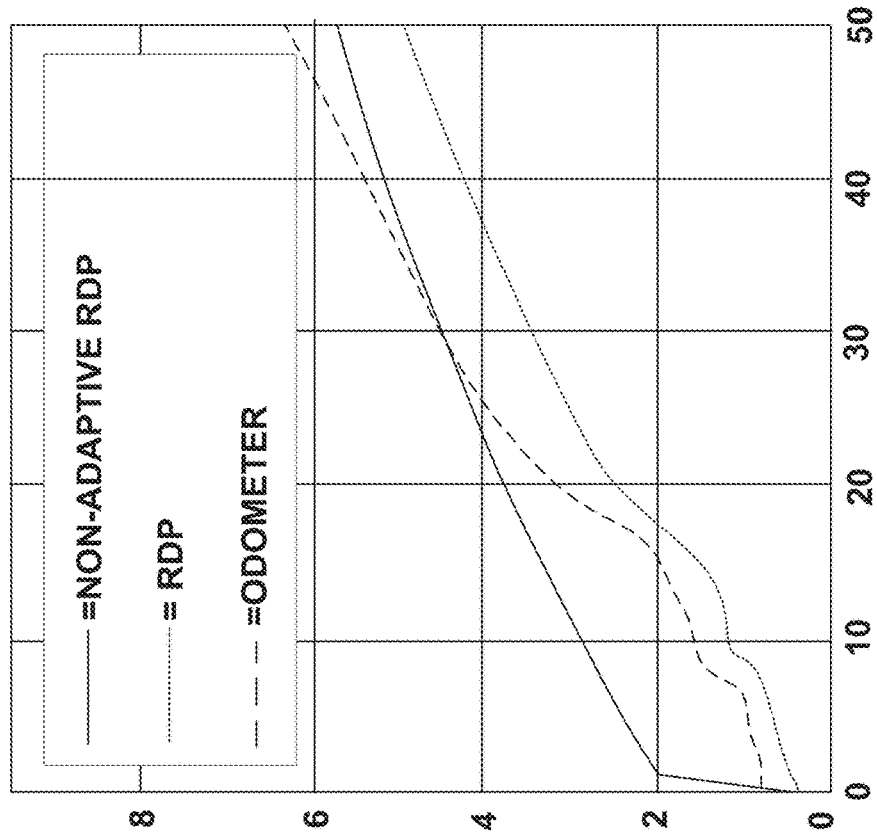
Figure 5C:
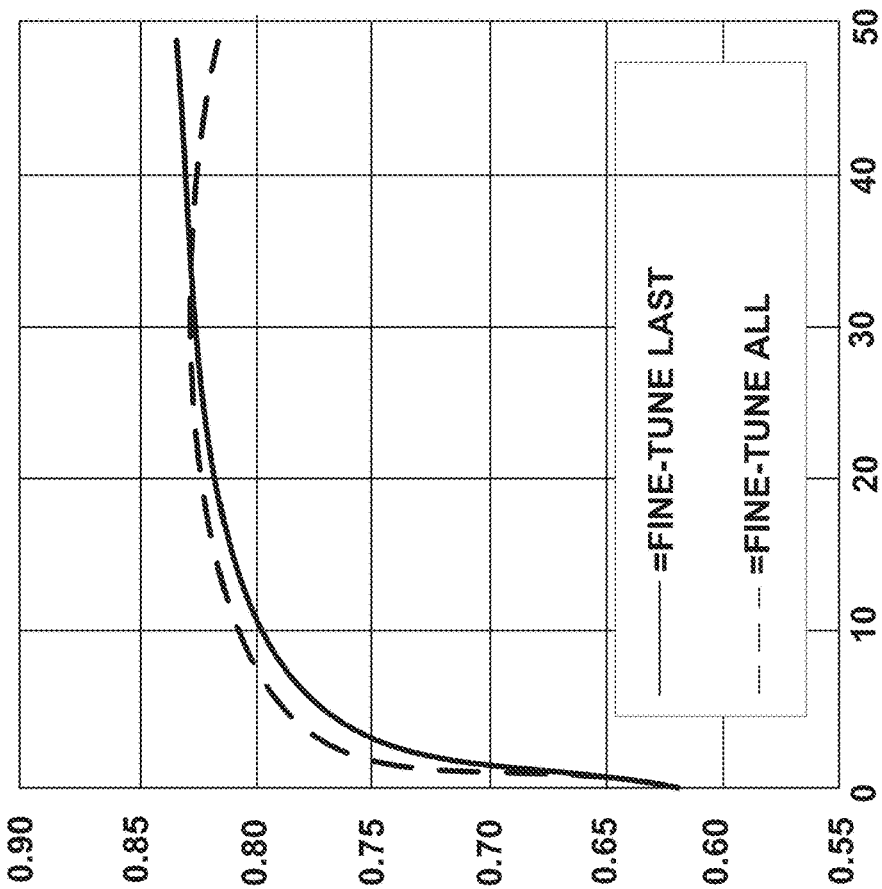

FIGS. 5A, 5B, 5C, 5D illustrate different parameters of fine tuning a DL DP model using an odometer discussed herein. FIG. 5A illustrates accuracy of the model over training iterations (epochs) for fine-tuning only a last layer and all layers, FIG. 5B illustrates privacy budget consumed over training iterations for prior RDP and a present odometer, FIG. 5C illustrates accuracy of the model over training iterations (epochs) for adaptively fine-tuning only a last layer and all layers, and FIG. 5D illustrates privacy budget consumed over training iterations for the adaptive fine-tuning.

To generate the graphs in FIGS. 5A-5D a Pytorch pre-trained ResNet18 model for ImageNet was fine-tuned so that it predicts classifications on images. A last layer of the original model was modified to output only 10 classes, and the images were re-sized so that they have an expected 224×224 size. When fine-tuning the whole model, BatchNorm parameters were frozen and the last layer was applied in test mode, because DP-SGD is not compatible with non-frozen Batch-Norm.

Results in FIGS. 5A and 5C are illustrated for training the last layer only. In each case, the model was fine-tuned for 50 epochs with a learning rate of 0.01, DP noise standard-deviation $\sigma=1$, and mini-batch size 512. For FIGS. 5C and 5D fine-tuning was combined with an adaptive policy that starts from a larger $\sigma=2$ DP noise, and decreases it by 0.1 decrements after every epoch during which the number of correctly predicted train set images did not significantly increase (e.g., significantly meaning a specified number of standard deviations, such as discussed elsewhere herein). Full fine-tuning took about 8 h on a Tesla M60 GPU and fine-tuning only the last layer took about 2.5 h.

FIGS. 5A-5D shows the accuracy reached during fine-tuning either the last layer or the entire model, as well as the DP budget consumption under RDP and the odometer. The RDP curve can be considered a privacy filter filling up until reaching the planned 50 epochs. One can stop at any time, but the entire budget is spent regardless of whether the training is stopped early or allowed to continue the full 50 epochs. Focusing on non-adaptive fine-tuning, FIG. 5A shows that one may want to use the fully fine-tuned model from epoch 20, and the end version of the last layer fine-tuned model. Either way, the full $\epsilon=5.76$ is spent for the RDP, but one can stop at the 20th epoch having spent only $\epsilon=4.7$.

If one has an accuracy goal, say 80%, they can do even better by using the adaptive policy to fine-tune the model. Under that policy, the fully fine-tuned model consistently reaches this accuracy under 8 epochs, for an odometer budget of $\epsilon=1.45$, an enormous saving. Without adaptation, the model reaches 80% accuracy in 6 epochs, but under a higher budget of $\epsilon=3.24$. Also note that the last layer fine-tuning barely suffers from the adaptive policy, yielding large privacy gains.

Aspects analyze DP composition with adaptively chosen privacy parameters through the lens of RDP. Privacy filters, which allow adaptive privacy budget within a fixed privacy loss upper-bound are proposed that do not incur any overhead compared to composition of privacy budgets known a priori. This privacy filter can be leveraged to construct a privacy odometer, which gives a running upper-bound on the privacy loss incurred under adaptive privacy budgets and when the sequence of DP computations can stop at any time.

This construction, and its leverage of RDP composition, enables efficient odometers in the large budget regime. Experiments demonstrated that these practical privacy filter and odometer enable new DP techniques in, for example, DL. By adapting the DP budget allocated to each gradient step and stopping training early, accuracy under a fixed privacy loss bound is improved and the total privacy loss incurred when fine-tuning a model is reduced. These results have broader applications, from the design of new DP techniques, to practical parameter tuning and architecture search for DP ML models.

AI Overview

AI is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
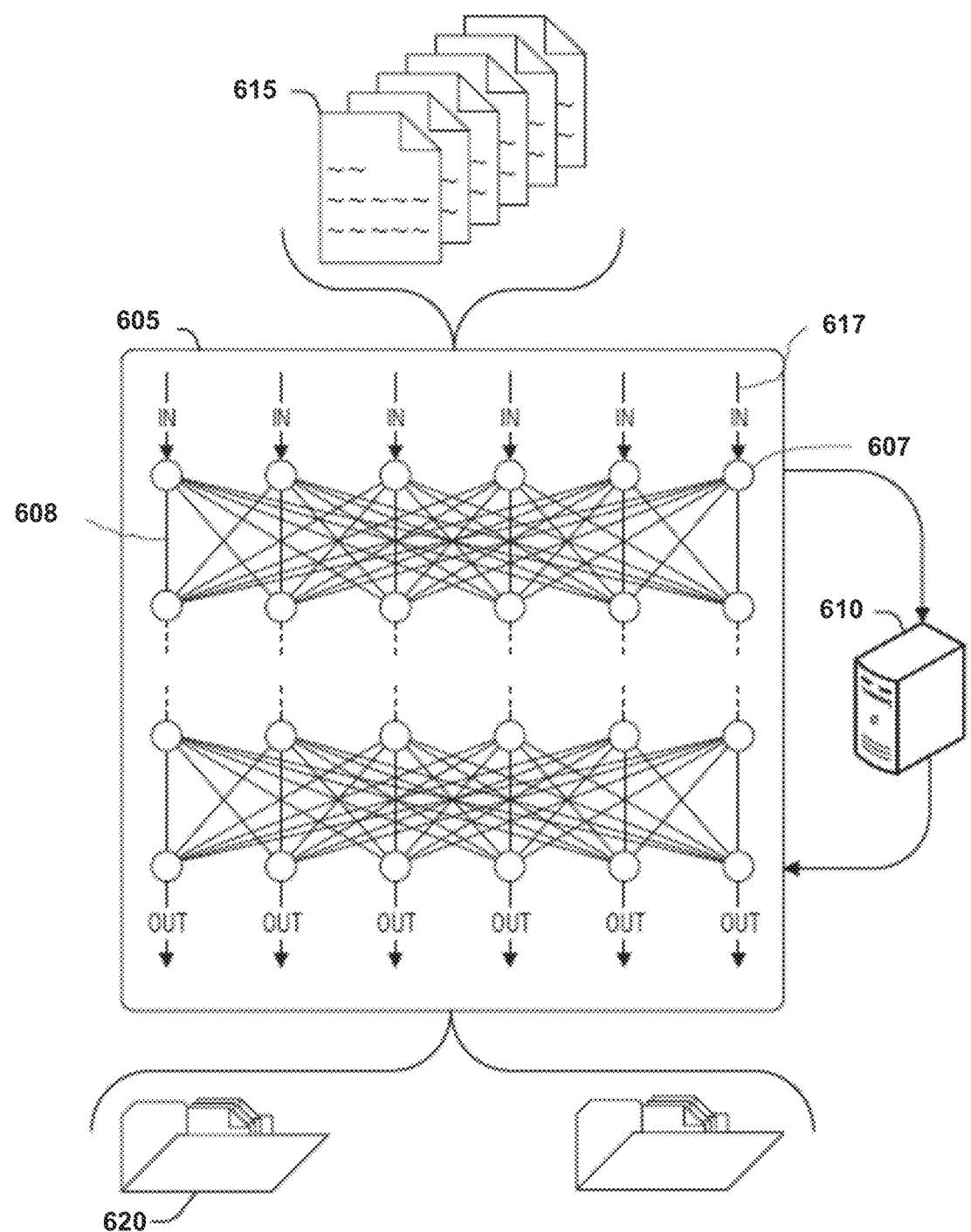
FIG. 6 is a block diagram of an example of an environment including a system for neural network training, according to an embodiment.

FIG. 6 is a block diagram of an example of an environment including a system for neural network training, according to an embodiment. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as a word, symbol, other part of speech, or the like. Each value of the training or input 617 to be classified once ANN 605 is trained, is provided to a corresponding node 607 in the first layer or input layer of ANN 605. The values propagate through the layers and are changed by the objective function.

As noted above, the set of processing nodes is arranged to train the neural network to create a trained neural network. Once trained, data input into the ANN will produce valid classifications 620 (e.g., the input data 617 will be assigned into categories), for example. The training performed by the set of processing nodes 607 is iterative. In an example, each iteration of the training the neural network is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Figure 7:
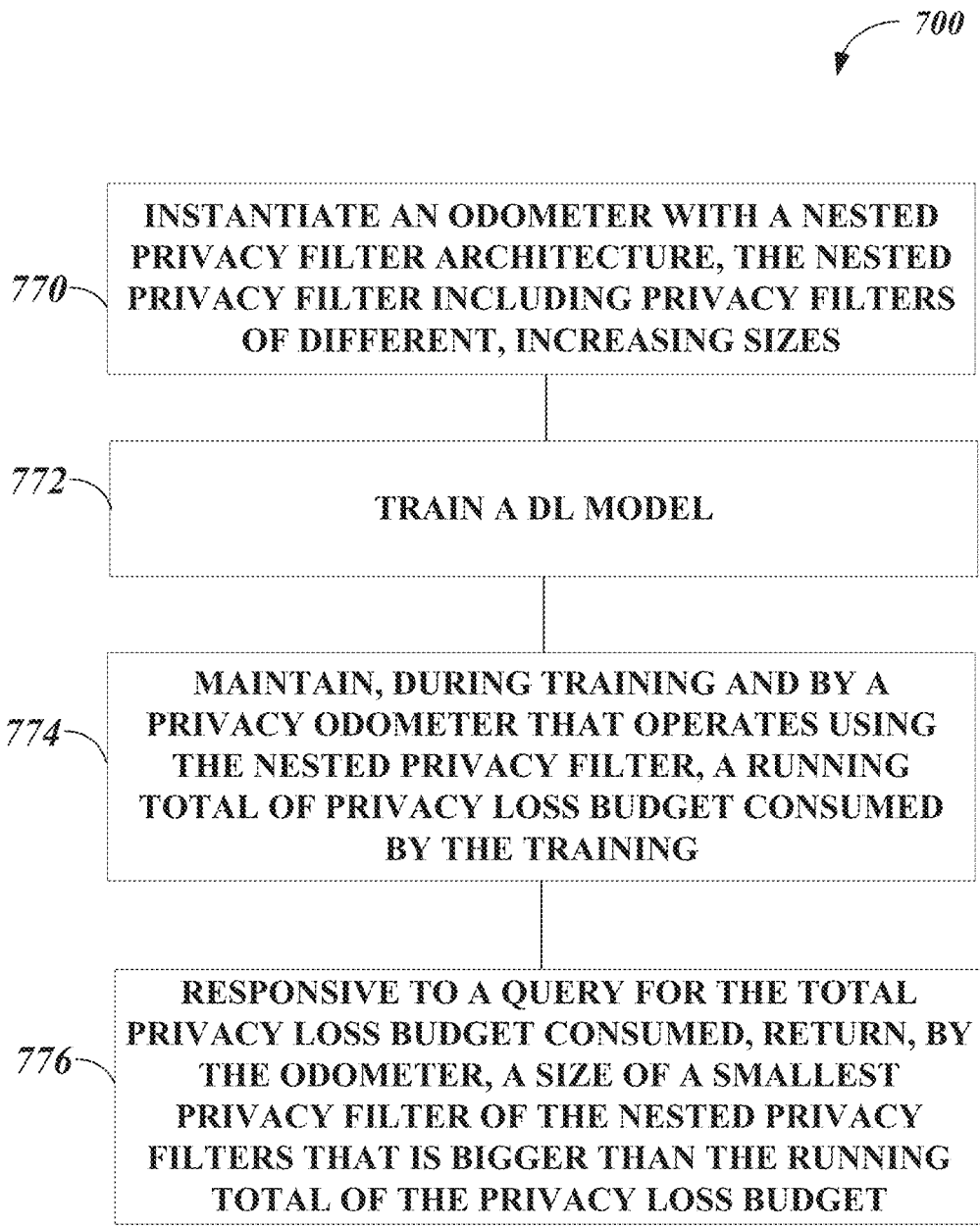
FIG. 7 illustrates, by way of example, a block diagram of an embodiment of a method for DP DL.

FIG. 7 illustrates, by way of example, a block diagram of an embodiment of a method 700 for DP DL. The method 700 as illustrated includes instantiating an odometer with a nested privacy filter architecture, the nested privacy filter including privacy filters of different, increasing sizes, at operation 770; training a DL model, at operation 772; maintaining, during training and by a privacy odometer that operates using the nested privacy filter, a running total of privacy loss budget consumed by the training, at operation 774; and responsive to a query for the total privacy loss budget consumed, returning, by the odometer, a size of a smallest privacy filter of the nested privacy filters that is bigger than the running total of the privacy loss budget, at operation 776.

The method 700 can further include, wherein the operations further comprise, after a specified number of iterations of training the DL model, determining a DL model characteristic of the DL model and accounting for a privacy loss budget consumed in determining the DL model characteristic. The method 700 can further include, wherein the DL model characteristic includes an overall training set or testing set accuracy of the DL model or a difference in training set or testing set accuracy between a current epoch and an immediately prior epoch. The method 700 can further include, wherein the DL model characteristic is the difference in training set or testing set accuracy. The method 700 can further include wherein the operations further comprise, responsive to determining the difference in training set or testing set accuracy satisfies a first criterion, decreasing an amount of privacy budget consumed in an immediately subsequent epoch. The method 700 can further include, wherein decreasing the amount of privacy budget consumed includes increasing an amount of noise applied to a gradient computation for updating the DL model. The method 700 can further include, wherein decreasing the amount of privacy budget consumed includes decreasing a batch size of training data for the next epoch. The method 700 can further include, wherein the operations further comprise, responsive to determining the difference in training set or testing set accuracy satisfies a different, second criterion, increasing an amount of privacy budget consumed in an immediately subsequent epoch. The method 700 can further include, wherein the DL model characteristic includes the overall training set or testing set accuracy of the DL model. The method 700 can further include wherein the operations further comprise, responsive to determining the overall training set or testing set accuracy satisfies a second criterion, terminating the training.

The method 700 can further include, wherein the operations further comprise, responsive to determining the running total of privacy loss budget consumed is such that a next iteration of training will make the running total of privacy loss budget consumed exceed a total allowable privacy loss, terminating the training. The method 700 can further include, wherein the operations further comprise receiving, from a user and by a user interface, the total allowable privacy loss.

Figure 8:
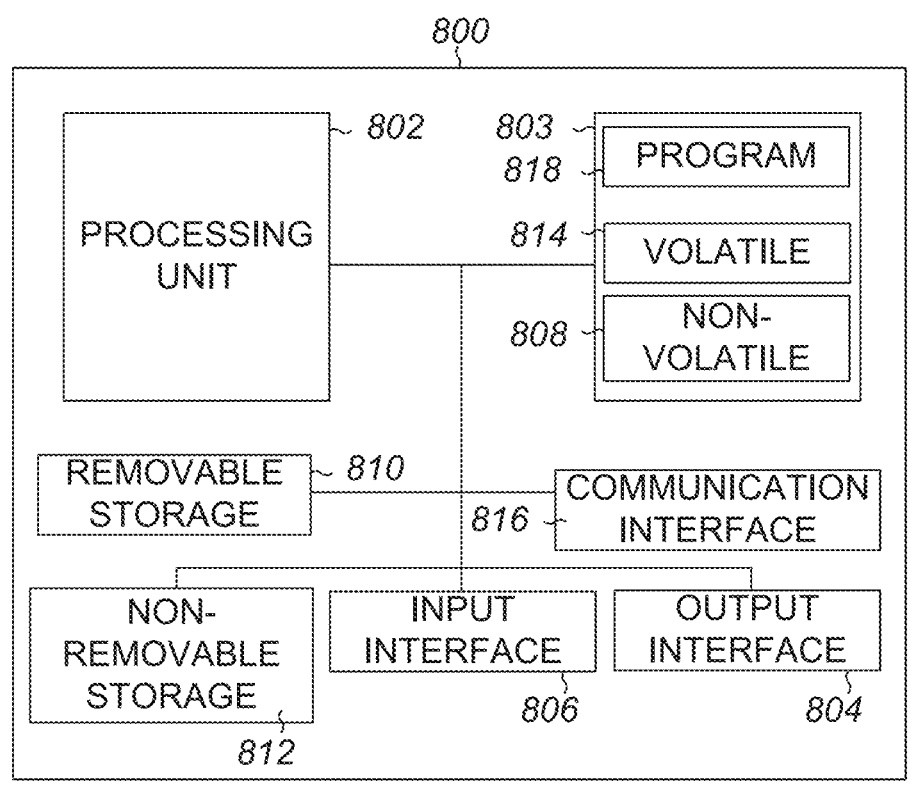
FIG. 8 illustrates, by way of example, a block diagram of an embodiment of a machine (e.g., a computer system) to implement one or more embodiments.

FIG. 8 illustrates, by way of example, a block diagram of an embodiment of a machine 800 (e.g., a computer system) to implement one or more embodiments. The machine 800 can implement a technique for DP DL. The client device 102, network 106, server 104, or a component thereof can include one or more of the components of the machine 800. One or more of the client device 102, network 106, server 104, method 200, method 300, or a component or operations thereof can be implemented, at least in part, using a component of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 618 may be used to cause processing unit 802 to perform one or more methods or algorithms described herein.

ADDITIONAL NOTES AND EXAMPLES

Example 1 can include a compute device comprising processing circuitry, and a memory coupled to the processing circuitry, the memory including instructions that, when executed by the processing circuitry, cause the processing circuitry to perform operations for differential privacy (DP) deep learning (DL) model generation, the operations comprising instantiating an odometer with a nested privacy filter architecture, the nested privacy filter including privacy filters of different, increasing sizes, training a DL model, maintaining, during training and by a privacy odometer that operates using the nested privacy filter, a running total of privacy loss budget consumed by the training, and responsive to a query for the total privacy loss budget consumed, returning, by the odometer, a size of a smallest privacy filter of the nested privacy filters that is bigger than the running total of the privacy loss budget.

In Example 2, Example 1 can further include, wherein the operations further comprise, after a specified number of iterations of training the DL model, determining a DL model characteristic of the DL model and accounting for a privacy loss budget consumed in determining the DL model characteristic.

In Example 3, Example 2 can further include, wherein the DL model characteristic includes an overall training set or testing set accuracy of the DL model or a difference in training set or testing set accuracy between a current epoch and an immediately prior epoch.

In Example 4, Example 3 can further include, wherein: the DL model characteristic is the difference in training set or testing set accuracy and the operations further comprise, responsive to determining the difference in training set or testing set accuracy satisfies a first criterion, decreasing an amount of privacy budget consumed in an immediately subsequent epoch.

In Example 5, Example 4 can further include, wherein decreasing the amount of privacy budget consumed includes increasing an amount of noise applied to a gradient computation for updating the DL model.

In Example 6, Example 4 can further include, wherein decreasing the amount of privacy budget consumed includes decreasing a batch size of training data for the next epoch.

In Example 7, at least one of Examples 4-6 can further include, wherein the operations further comprise, responsive to determining the difference in training set or testing set accuracy satisfies a different, second criterion, increasing an amount of privacy budget consumed in an immediately subsequent epoch.

In Example 8, at least one of Examples 3-7 can further include, wherein the DL model characteristic includes the overall training set or testing set accuracy of the DL model, and the operations further comprise, responsive to determining the overall training set or testing set accuracy satisfies a second criterion, terminating the training.

In Example 9, at least one of Examples 1-8 can further include, wherein the operations further comprise, responsive to determining the running total of privacy loss budget consumed is such that a next iteration of training will make the running total of privacy loss budget consumed exceed a total allowable privacy loss, terminating the training.

In Example 10, Example 9 can further include, wherein the operations further comprise receiving, from a user and by a user interface, the total allowable privacy loss.

Example 11 can include a method for performing the operations of the processing circuitry of at least one of Examples 1-10.

Example 12 can include a non-transitory machine-readable medium including instructions that, when executed by a machine, cause the machine to perform operations comprising the operations of the processing circuitry of at least one of Examples 1-10.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A compute device comprising:
   processing circuitry;
   a memory coupled to the processing circuitry, the memory including instructions that, when executed by the processing circuitry, cause the processing circuitry to perform operations for differential privacy (DP) deep learning (DL) model generation, the operations comprising:
   instantiating a privacy odometer including privacy filters of different sizes;
   training a DL model;
   maintaining, during the training and by the privacy odometer that operates using the privacy filters, a running total of privacy loss budget consumed by the training; and
   responsive to a query for the running total of the privacy loss budget consumed, returning, by the privacy odometer, a size of a smallest privacy filter of the privacy filters that is bigger than the running total of the privacy loss budget.

2. The compute device of claim 1, wherein the operations further comprise, after a specified number of iterations of the training of the DL model, determining a DL model characteristic of the DL model and accounting for a privacy loss budget consumed in determining the DL model characteristic.

3. The compute device of claim 2, wherein the DL model characteristic includes an overall training set accuracy of the DL model or a difference in training set accuracy between a current epoch and an immediately prior epoch.

4. The compute device of claim 3, wherein:
   the DL model characteristic is the difference in training set accuracy; and
   the operations further comprise, responsive to determining the difference in training set accuracy satisfies a first criterion, decreasing an amount of privacy budget consumed in an immediately subsequent epoch.

5. The compute device of claim 4, wherein decreasing the amount of privacy budget consumed includes increasing an amount of noise applied to a gradient computation for updating the DL model.

6. The compute device of claim 4, wherein decreasing the amount of privacy budget consumed includes decreasing a batch size of training data for a next epoch.

7. The compute device of claim 4, wherein the operations further comprise, responsive to determining the difference in training set accuracy satisfies a different, second criterion, increasing an amount of privacy budget consumed in an immediately subsequent epoch.

8. The compute device of claim 3, wherein:
   the DL model characteristic includes the overall training set accuracy of the DL model; and
   the operations further comprise, responsive to determining the overall training set accuracy satisfies a third criterion, terminating the training of the DL model.

9. The compute device of claim 1, wherein the operations further comprise, responsive to determining the running total of the privacy loss budget consumed is such that a next iteration of the training will make the running total of the privacy loss budget consumed exceed a total allowable privacy loss, terminating the training.

10. The compute device of claim 9, wherein the operations further comprise receiving, from a user and by a user interface, the total allowable privacy loss.

11. A method for differential privacy (DP) deep learning (DL) model generation, the method comprising:
    instantiating a privacy odometer including privacy filters of different sizes;
    training a DL model;
    maintaining, during the training and by the privacy odometer that operates using the privacy filters, a running total of privacy loss budget consumed by the training; and
    responsive to a query for the running total of the privacy loss budget consumed, returning, by the privacy odometer, a size of a smallest privacy filter of the privacy filters that is bigger than the running total of the privacy loss budget.

12. The method of claim 11, further comprising, after a specified number of iterations of the training of the DL model, determining a DL model characteristic of the DL model and accounting for a privacy loss budget consumed in determining the DL model characteristic.

13. The method of claim 12, wherein the DL model characteristic includes an overall training set accuracy of the DL model or a difference in training set accuracy between a current epoch and an immediately prior epoch.

14. The method of claim 13, wherein:
    the DL model characteristic is the difference in training set accuracy; and
    the method further comprises, responsive to determining the difference in training set accuracy satisfies a first criterion, decreasing an amount of privacy budget consumed in an immediately subsequent epoch.

15. The method of claim 14, wherein decreasing the amount of privacy budget consumed includes increasing an amount of noise applied to a gradient computation for updating the DL model.

16. The method of claim 14, wherein decreasing the amount of privacy budget consumed includes decreasing a batch size of training data for a next epoch.

17. The method of claim 14, further comprising, responsive to determining the difference in training set accuracy satisfies a different, second criterion, increasing an amount of privacy budget consumed in an immediately subsequent epoch.

18. The method of claim 13, wherein:
    the DL model characteristic includes the overall training set accuracy of the DL model; and
    the method further comprises, responsive to determining the overall training set accuracy satisfies a second criterion, terminating the training of the DL model.

19. A non-transitory machine-readable medium including instructions that, when executed by a machine, cause the machine to perform operations for differential privacy (DP) deep learning (DL) model generation, the operations comprising:
    instantiating a privacy odometer including privacy filters of different sizes;
    maintaining, during training of a DL model and by the privacy odometer that operates using the privacy filters, a running total of privacy loss budget consumed by the training;
    responsive to a query, returning a size of a smallest privacy filter of the privacy filters that is bigger than the running total of the privacy loss budget; and
    responsive to receiving data indicating to halt the training of the DL model, terminating the training of the DL model.

20. The non-transitory, machine-readable medium of claim 19, wherein the operations further comprise, responsive to determining the running total of the privacy loss budget consumed is such that a next iteration of the training of the DL model will make the running total of the privacy loss budget consumed exceed a total allowable privacy loss, terminating the training of the DL model.

* * * * *